(12) United States Patent
Sasaki et al.

(10) Patent No.: US 6,977,796 B2
(45) Date of Patent: Dec. 20, 2005

(54) WIRING PATTERN AND METHOD OF MANUFACTURING THE SAME AND THIN FILM MAGNETIC HEAD AND METHOD OF MANUFACTURING THE SAME

(75) Inventors: Yoshitaka Sasaki, Sunnyvale, CA (US); Takehiro Kamigama, Kwai Chung (CN)

(73) Assignees: Headway Technologies, Inc., Milpitas, CA (US); SAE Magnetics (H.K.), Ltd., Hong Kong (CN)

( * ) Notice: Subject to any disclaimer, the term of this patent is extended or adjusted under 35 U.S.C. 154(b) by 158 days.

(21) Appl. No.: 10/067,863

(22) Filed: Feb. 8, 2002

(65) Prior Publication Data

US 2003/0151849 A1  Aug. 14, 2003

(51) Int. Cl.$^7$ ............................................. G11B 5/17
(52) U.S. Cl. .................. 360/123; 336/200; 29/603.23; 29/603.24; 29/603.25
(58) Field of Search ................................ 360/123, 126; 336/200; 29/603.23, 603.24, 603.25

(56) References Cited

U.S. PATENT DOCUMENTS 6,191,918 B1 * 2/2001 Clarke et al. ................ 360/126
6,466,401 B1 * 10/2002 Hong et al. .................. 360/123

* cited by examiner

*Primary Examiner*—Robert S. Tupper
(74) *Attorney, Agent, or Firm*—Oliff & Berridge PLC

(57) ABSTRACT

A bottom track pole is formed on a surface of a bottom pole, a thin film coil is formed on the bottom pole to form a flat coplanar surface with the bottom track pole, a write gap film is formed on the flat coplanar surface, first and second magnetic material films constituting a top pole are formed on a flat surface of the thin film coil, and the second magnetic material film, first magnetic material film, write gap film and bottom track pole are partially removed by RIE to form a top track pole and trim structure in a self-aligned manner. The thin film coil is formed by a first thin film coil half and a second thin film coil half having coil windings which are formed in a self-aligned manner between successive coil windings of the first thin film coil half and have a two-layer structure of a first conductive film at least a part of which is formed by CVD and a second conductive film formed by electrolytic plating. A thin insulating film is interposed between successive coil windings of the first and second thin film coil halves. Jumper wirings for connecting an innermost coil winding of the first thin film coil half to an outermost coil winding of the second thin film coil half are formed together with the top pole.

14 Claims, 29 Drawing Sheets

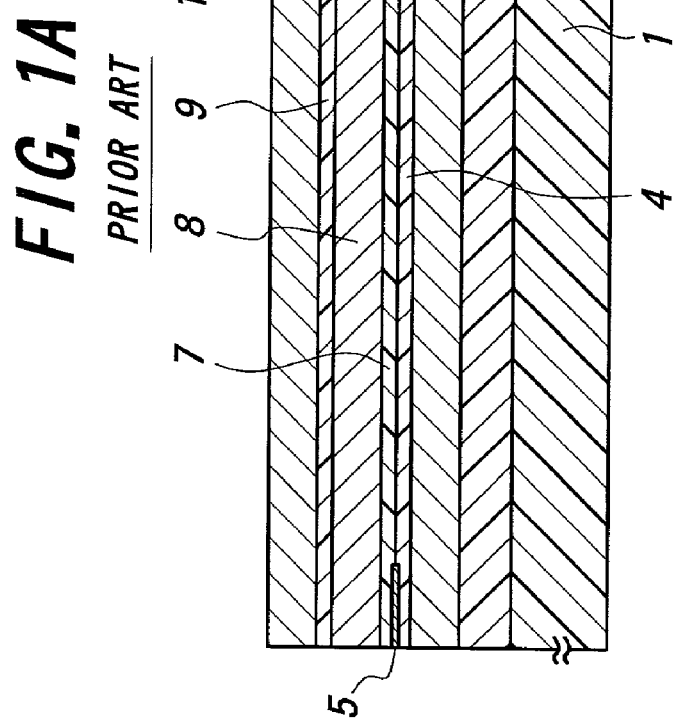
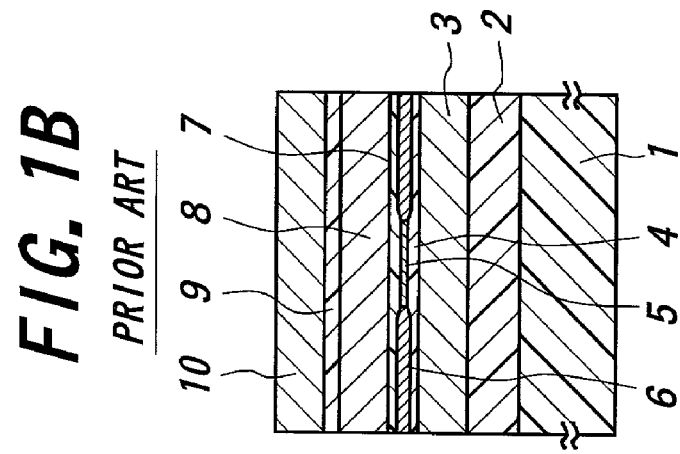
FIG. 1A PRIOR ART
FIG. 1B PRIOR ART

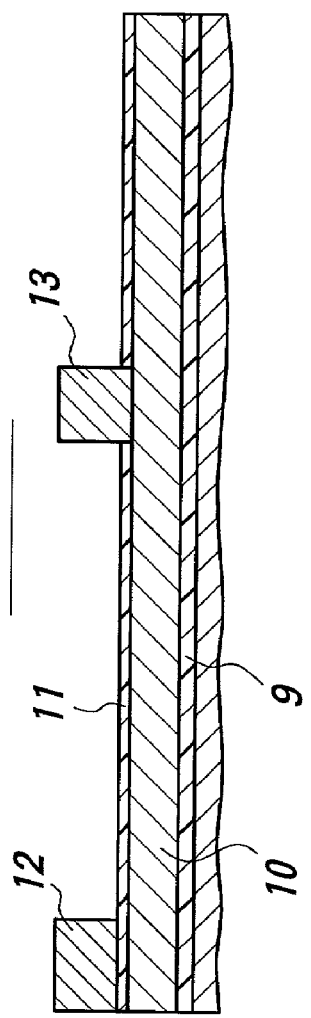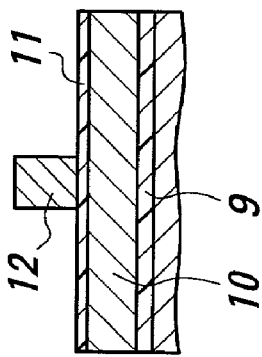

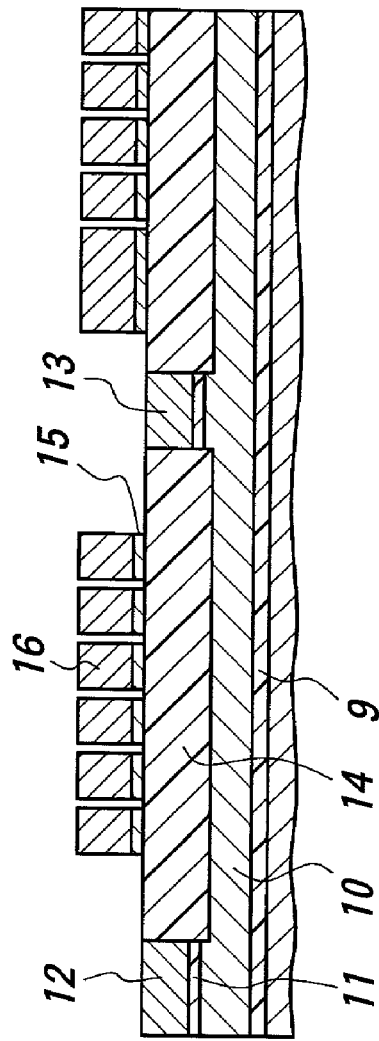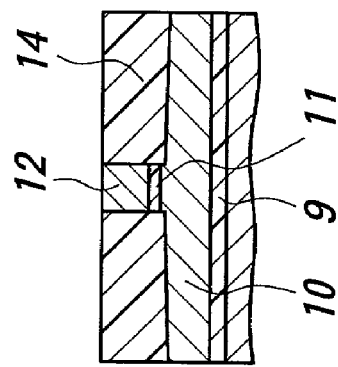

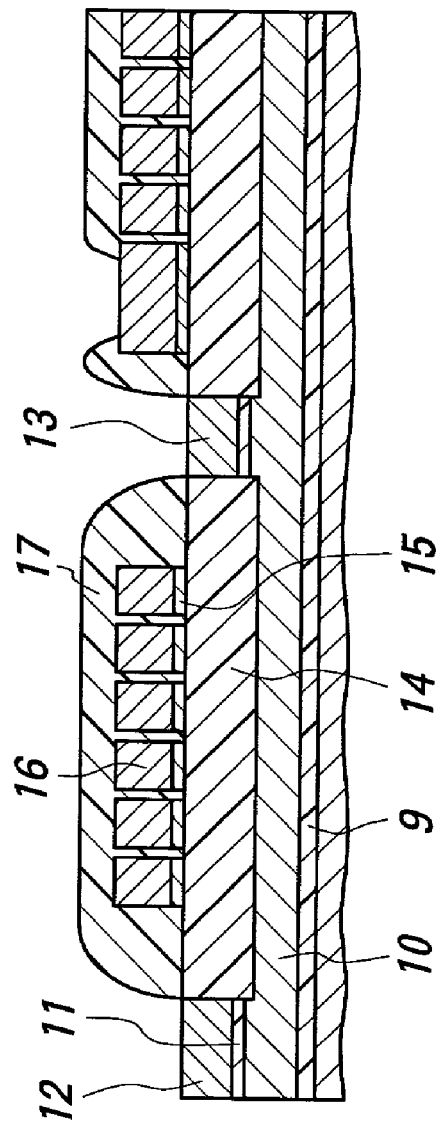
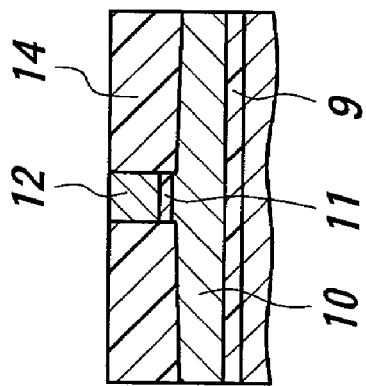
FIG. 6A PRIOR ART
FIG. 6B PRIOR ART

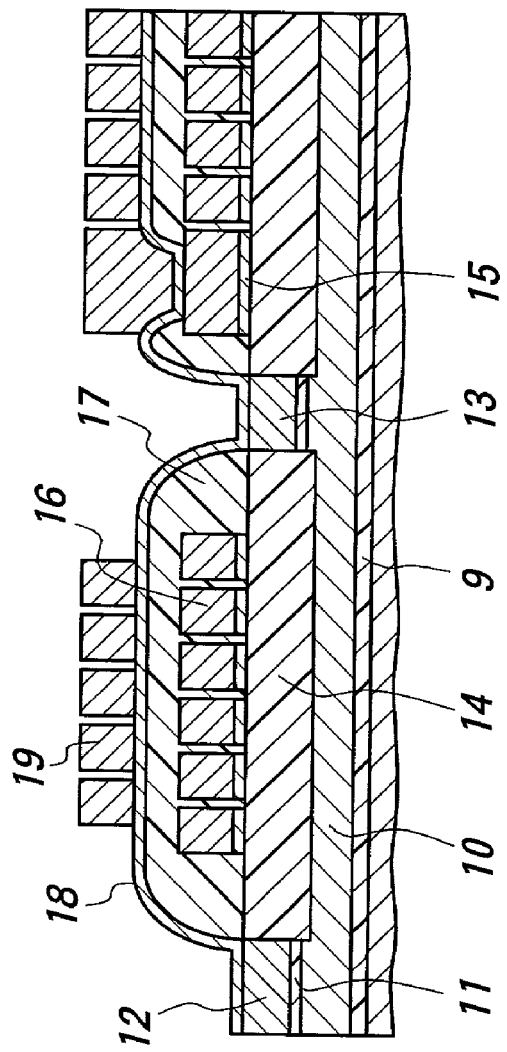
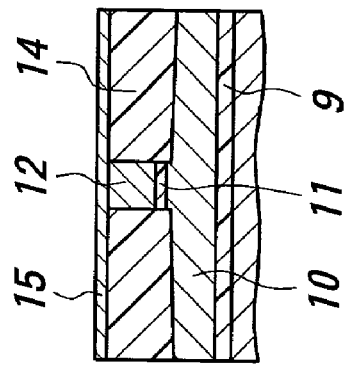
FIG. 7A
PRIOR ART
FIG. 7B
PRIOR ART

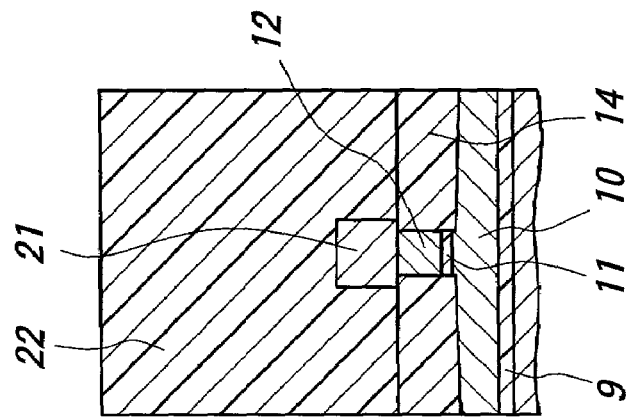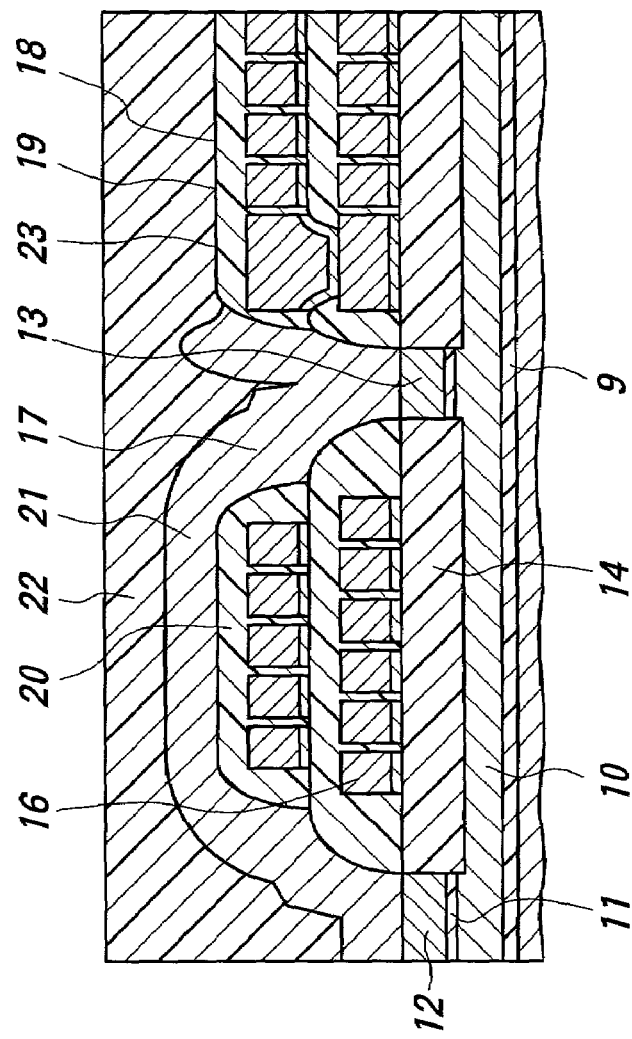

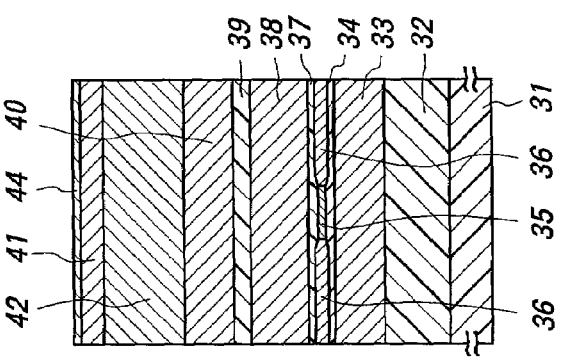
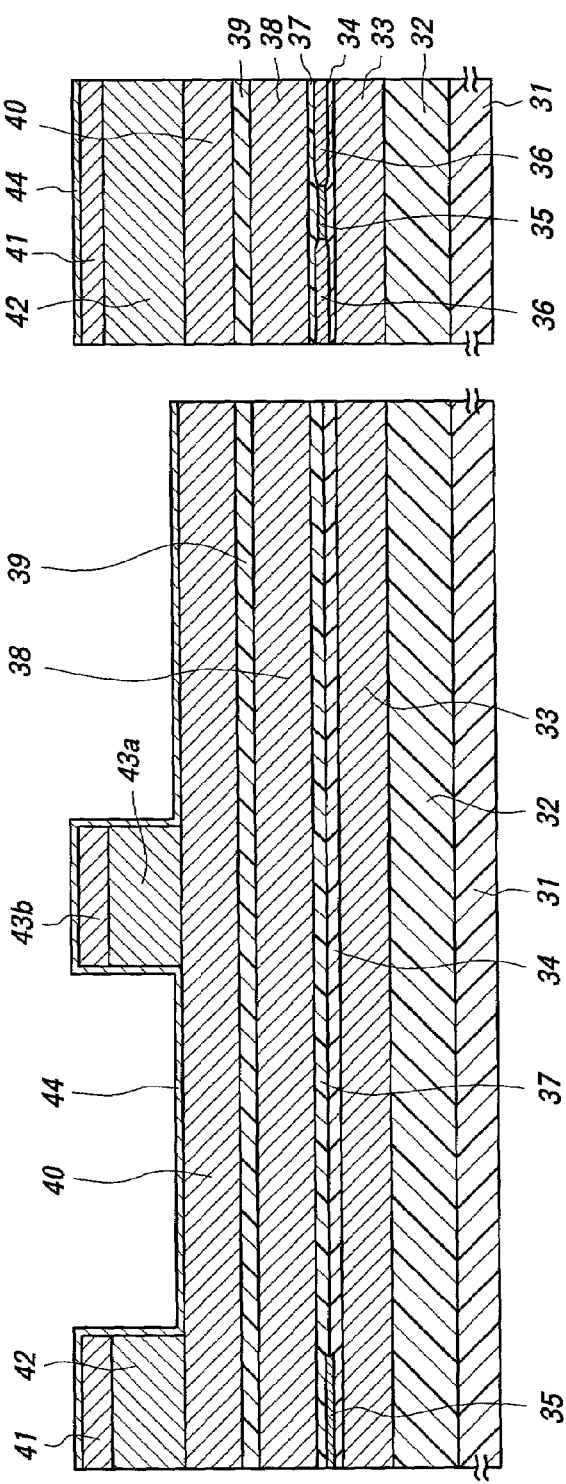

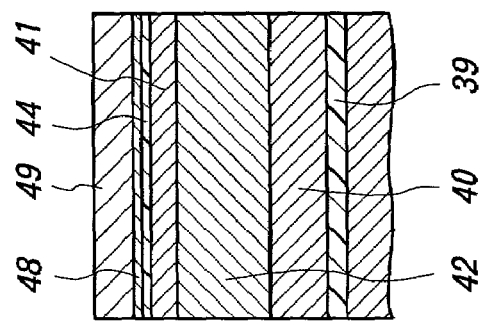
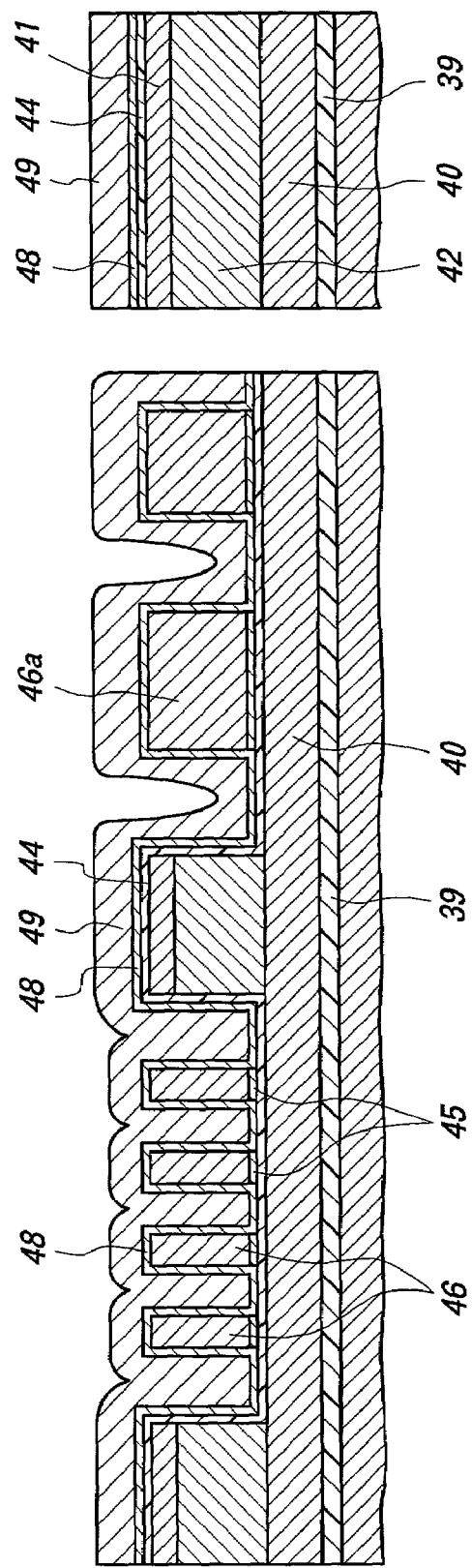
FIG. 12B
FIG. 12A

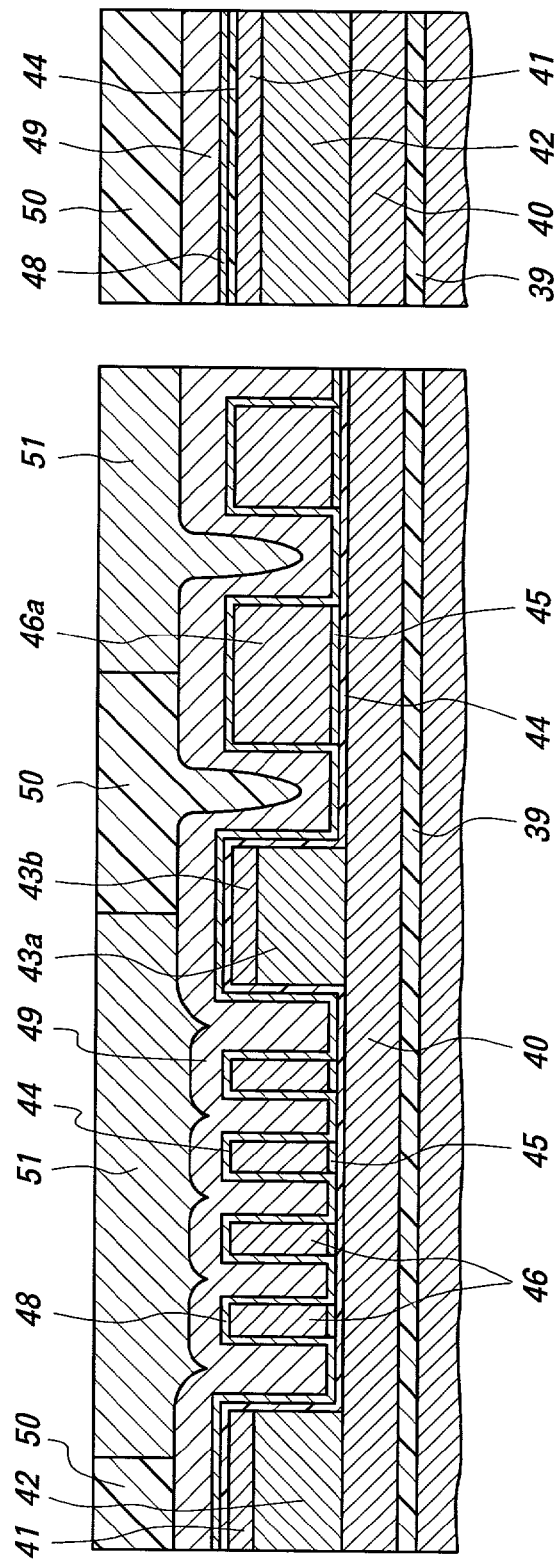

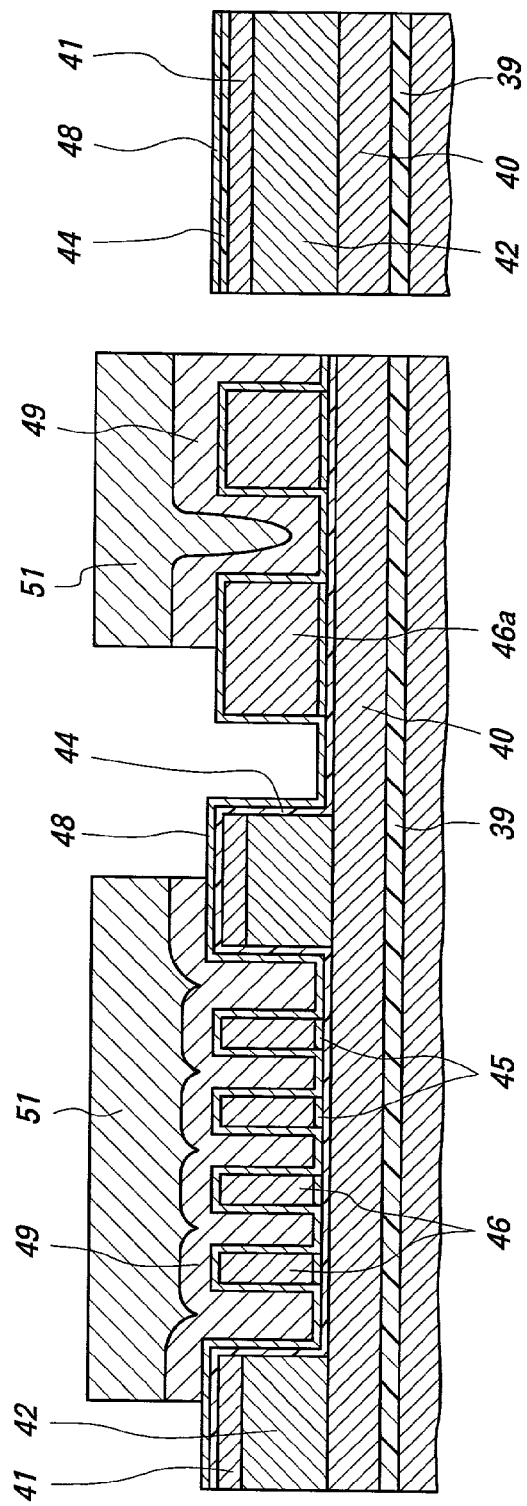

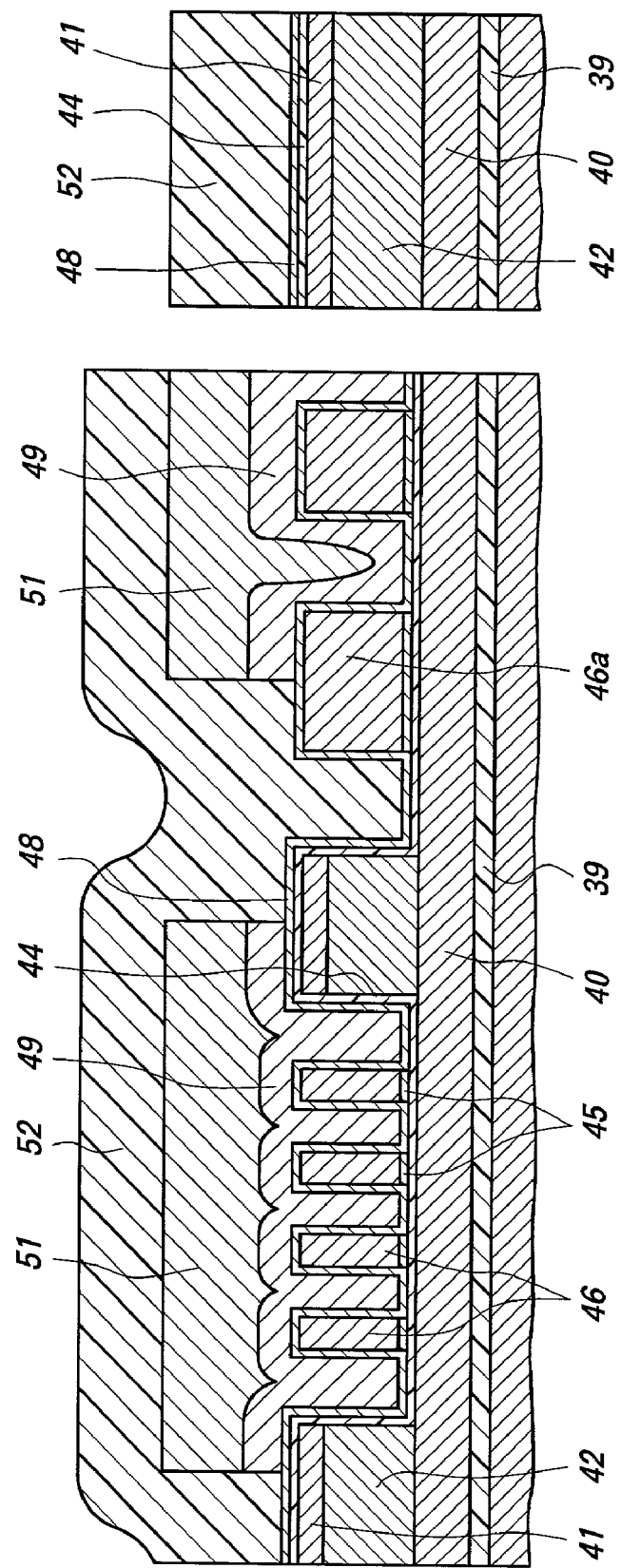

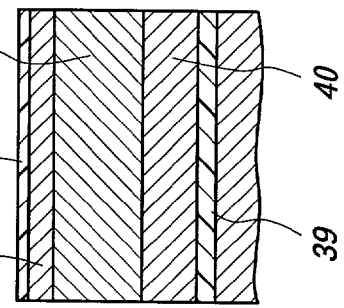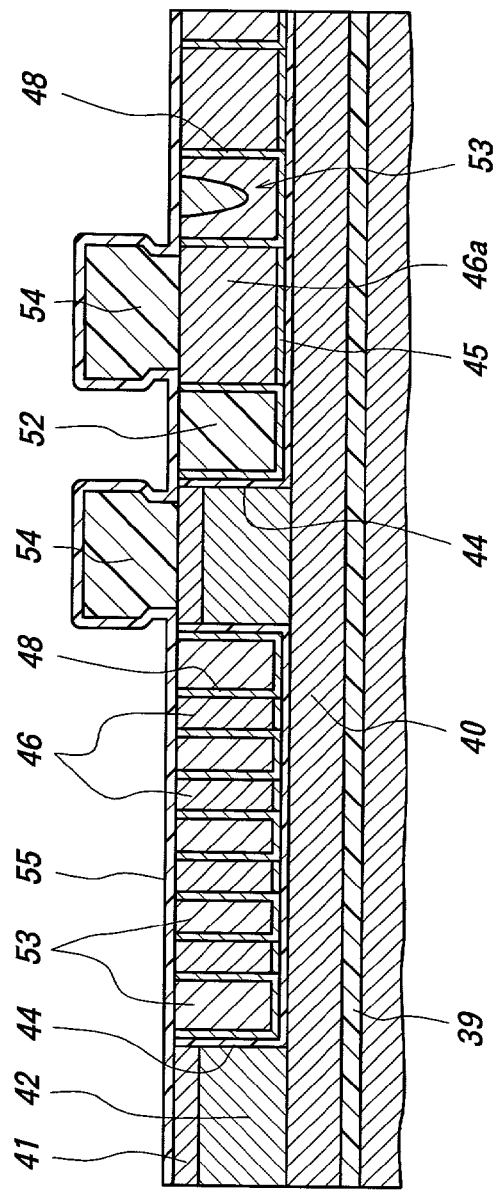

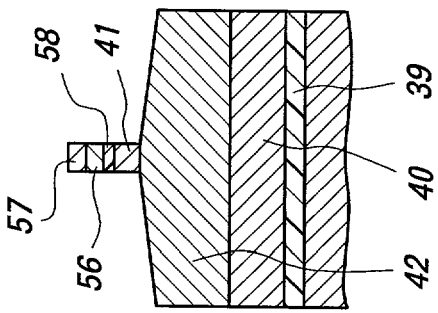
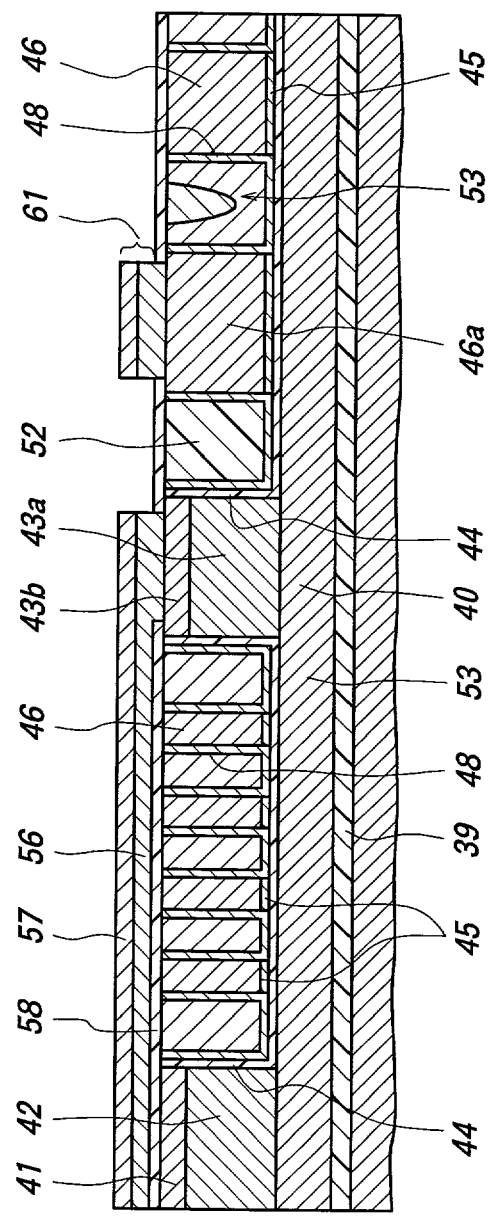

WIRING PATTERN AND METHOD OF MANUFACTURING THE SAME AND THIN FILM MAGNETIC HEAD AND METHOD OF MANUFACTURING THE SAME

BACKGROUND OF THE INVENTION

1. Field of the Invention

The present invention generally relates to an electrically conductive wiring pattern and a method of manufacturing the same, and also relates to a thin film magnetic head comprising a thin film coil formed by a wiring patter, The present invention also relates to a combination type thin film magnetic head having an inductive type writing thin film magnetic head element and a magnetoresistive type reading thin film magnetic head element stacked one on the other, and a method of manufacturing the same. More particularly, the present invention relates to a combination type thin film magnetic head and a method of manufacturing the same, in which a GMR element is used as a magnetoresistive type thin film magnetic head element and an inductive type thin film magnetic head element has a superior NTSL property by extremely shortening a magnetic path length by reducing a coil winding pitch of a thin film coil and has a narrow record track for attaining a high surface recording density on a magnetic record medium by providing a miniaturized track pole made of a magnetic material having a high saturation magnetic flux density.

2. Description of the Related Art

Recently a surface recording density of a hard disc device has been improved, and it has been required to develop a thin film magnetic head having an improved performance accordingly. A recent magnetoresistive type thin film magnetic head using a GMR (Giant Magneto-Resistive) element has a surface recording density up to 100 gigabits/inch$^2$. A combination type thin film magnetic head is constructed by stacking an inductive type thin film magnetic head intended for writing information on a magnetic record medium and a magnetoresistive type thin film magnetic head intended for reading information out of the magnetic record medium on a substrate. As a reading magnetoresistive element, a GMR element having a magnetoresistive change larger than a normal anisotropic MR element by 5–15 times has been used. In order to improve a performance of the GMR element, there have been various proposals.

In a normal anisotropic MR element, a single film of a magnetic material showing the magnetoresistive effect is utilized. Many GMR elements have a multi-layer structure having a stack of a plurality of films. There are several mechanisms for generating a resistance change in the GMR element, and the multi-layer structure is dependent upon a mechanism. For instance, a super-lattice GMR film and a glanular film have a simple structure and a large resistance change under a weak magnetic field. A spin-valve GMR film will be suitable for a large scale manufacture. A performance of the reading head element is determined by not only the above mentioned selection of materials, but also by pattern widths such as an MR height and a track width. The track width is determined by a photolithography process and the MR height is determined by an amount of polishing for forming an air bearing surface (ABS).

At the same time, the performance of the recording magnetic head is also required to be improved in accordance with the improvement of the performance of the reproducing magnetic head. In order to increase a surface recording density, it is necessary to realize a high track density on a magnetic record medium. To this end, a pole portion of the recording thin film magnetic head element has to be narrowed in a sub-micron order, particularly not larger than 0.2 $\mu$m by utilizing the semiconductor manufacturing process. However, upon decreasing a track width by utilizing the semiconductor manufacturing process, there is a problem that a sufficiently large magnetic flux could not be obtained due to a miniaturized structure of the pole portion. In this manner, by replacing the MR film by the GMR film in the reproducing head element and by selecting a material having a high magnetoresistive sensitivity, it is possible simply to attain a desired high surface recording density.

In order to realize a sufficiently high surface recording density of about 100 gigabits/inch$^2$, it is necessary to use a record medium, i.e. a magnetic disk material having a high magnetic coercive force. If a magnetic material having a high coercive force is not used, once recorded data might be erased due to the thermal fluctuation. When a material magnetic having a high coercive force is used, recoding requires a large magnetic flux, and therefore a inductive type thin film magnetic head element must generate a large magnetic flux. Generally, in order to generate a large magnetic flux in the inductive type thin film magnetic head element, a track pole is made of a magnetic material having a high saturation magnetic flux density (Hi-Bs material having a saturation magnetic flux density not less than 1.8 T (tesla). NiFe (80:20) of 1.0 T and NiFe (45:55) have been used as a magnetic material having a high saturation magnetic flux density. Recently, CoNiFe of 1.8~2.0 T has been used. In order to use a miniaturized track pole stably, a magnetic material having saturation magnetic flux density of about 1.8 T is generally used. However, when a width of the track pole is reduced to sub-micron order, such magnetic materials could not generate a sufficiently large magnetic flux for recording stably. In this manner, it is required to use a magnetic material having a higher saturation magnetic flux density. Heretofore, when a track pole is made of a magnetic material having a high saturation magnetic flux density, a plating method has been generally used. However, in order to manufacture a track pole having a narrow width, it is preferable to use a sputtering method. From this view point, it will be advantageous to form a track pole by sputtered films of FeN having a saturation magnetic flux density of 2.0 T FeCo of 2.4 T.

FIGS. 1–9 are cross sectional views showing successive steps of a method of manufacturing a conventional combination type thin film magnetic head. In these drawings, A represents a cross sectional view cut along a plane perpendicular to the air bearing surface and B denotes a cross sectional view of a pole portion cut along a plane parallel to the air bearing surface. The combination type thin film magnetic head includes an inductive type recording magnetic head element provided on a magnetoresistive type reading magnetic head element.

As shown in FIGS. 1A and 1B, an alumina (Al$_2$O$_3$) insulating film 2 having a thickness of about 2–3 $\mu$m is deposited on a substance 1 made of AlTiC. Next, a bottom shield film 3 made of a magnetic material for magnetically shielding a GMR reading head element from an external magnetic field on the substrate. On the bottom shield film 3, a shield gap film 4 made of alumina is formed with a thickness of 30–35 nm by sputtering. Then, a GMR film 5 having a given layer-structure is formed, and lead electrodes 6 for the GMR film are formed by a lift-off process. Next, a top shield gap film 7 made of alumina is formed with a thickness of 30–35 nm by sputtering, and a magnetic material film 8 serving as a top shield film is formed with a thickness of about 3 $\mu$m.

Next, an isolation film 9 made of alumina is formed with a thickness of about 0.3 μm for isolating the reading GMR head element from a writing induction type thin film magnetic head element to suppress noise in a reproduced output from the GMR head element. After that, a bottom pole 10 of the recording head element made of permalloy is formed with a thickness of 1.5–2.0 μm. The bottom pole 10 is formed by a plating film of CoNiFe. It should be noted that in the drawings a ratio of thickness of various portions does not exactly correspond to an actual ratio. For instance, the isolation film 9 is shown to have a smaller thickness.

Next, as depicted in FIGS. 2A and 2B, on the bottom pole 10, is formed a write gap film 11 made of a non-magnetic material to have a thickness of about 100 nm, and a top track pole 12 made of a permalloy which is a magnetic material having a high saturation magnetic flux density is formed in accordance with a given pattern. At the same time, a bridge portion 13 for magnetically coupling the bottom pole 10 with a top pole to be formed later at a back-gap is formed. The top track pole 12 and bridge portion 13 are formed by plating with a thickness of about 3–4 μm.

Then, in order to avoid a widening of an effective track width, i.e. in order to prevent a magnetic flux from extending at the bottom pole 10 during a writing operation, the write gap film 11 and the underlying bottom pole 10 around the top track pole 12 are etched by ion milling to form a so-called trim structure. After that, forming an alumina insulating film 14 having a thickness of about 3 μm over a whole surface, a surface is flattened by the chemical mechanical polishing (CMP) as shown in FIGS. 3A and 3B.

Next, as illustrated in FIGS. 4A and 4B, in order to form a thin film coil by the electrolytic plating of Cu, a thin seed layer 15 having a thickness of about 100 nm is formed by sputtering. After forming a resist film having a given opening pattern on the seed layer, a first layer thin film coil 16 is formed with a thickness of 1.5 μm in accordance with a given pattern by a plating process using a copper sulfate liquid. Then, after removing the resist film, the exposed seed layer 15 is removed by an ion milling process using an argon ion beam as depicted in FIGS. 5A and 5B. In this manner, the seed layer 15 is removed to separate coil windings to form a coiled conductor. During the ion milling, in order to prevent portions of the seed layer 15 projecting from side edges of the coil windings of the thin film coil 16 from being remained, the ion milling is performed at an angle of 5–10°. When the ion milling is carried out at an angle near a perpendicular angle, debris of the seed layer 15 splashed by impingement of the ion beam might be adhered again to the coil windings. Therefore, a distance between successive coil windings must be widened.

Then, as shown in FIGS. 6A and 6B, an insulating film 17 which supports the first layer thin film coil 16 in an electrically insolated manner is formed by photoresist. Next, as depicted in FIGS. 7A and 7B, a Cu seed layer 18 is formed and a second layer thin film coil 19 is formed in accordance with a given pattern with a thickness of 1.5 μm. Then, after removing the seed layer 18 by ion milling, an insulating film 20 of photoresist for supporting the second layer thin film coil 19 in an electrically insulating manner is formed. Next, as illustrated in FIGS. 8A and 8B, a top pole 21 made of permalloy is formed with a thickness of about 3 μm such that the top track pole 12 and bridge portion 13 are coupled with each other by the top pole 21, and a whole surface is covered with an overcoat film 22 made of alumina. It should be noted that during the formation of the second thin film coil 19, a connect portion 23 for connecting inner portions of the first and second thin film coils 16 and 19 is formed. Finally, an end surface into which the GMR film 5, write gap film 11, top track pole 12 and so on are exposed is polished to form an air bearing surface ABS to complete a slider. In a manufacturing process for forming an actual thin film magnetic head, after forming a number of the above mentioned structures on the wafer, the wafer is divided in a plurality of bars in each of which a number of thin film heads are aligned. Then, a side edge of the bar is polished to obtain the air bearing surface ABS.

FIG. 9 shows schematically a cross sectional view and a plan view illustrating the structure of the known combination type thin film magnetic head manufactured in the manner explained above. The bottom pole 10 has a large area, but the top track pole 12 and top pole 21 have a smaller area than the bottom pole. One of factors determining the performance of the writing head element is a throat height TH. The throat height TH is a distance from the air bearing surface ABS to an edge of the insulating film 14, and this distance is desired to be short. One of factors determining the performance of the reading head element is an MR height MRH. This MR height (MRH) is a distance from the air bearing surface ABS into which one edge of the GMR film 15 is exposed to the other edge of the GMR film. During the manufacturing process, a desired MR height MRH is obtained by controlling an amount of polishing the air bearing surface ABS.

There is another factor determining the performance of the thin film magnetic head together with the above mentioned throat height TH and MR height MRH. This factor is an apex angle θ, which is defined by an angle formed by a tangential line to a side wall of the insulating film 17 isolating the thin film coil 16 and an upper surface of the top pole 21. In order to miniaturize the thin film magnetic head, it is required to increase the apex angle θ as large as possible.

Now problems in the known combination type thin film magnetic head mentioned above will be explained. After forming the insulating film 17, 20 such that the thin film coil 16, 19 is supported by the insulating film in an electrically insulating manner, the top pole 21 is formed. In this case, the top pole 21 has to be formed into a given pattern along the side wall of the insulating film 17, 20. To this end, a photoresist is formed with a thickness of 3–4 μm at a step of the insulating film having a height of about 7–10 μm. Now it is assumed that at the side wall of the insulating film 16, 19, the photoresist should have a thickness of at least 3 μm, a thickness of the photoresist at the bottom of the step would become thick such as 8–10 μm. Since a width of record track of the writing head is mainly determined by a width of the top track pole 12, it is not necessary to miniaturize the top pole 21 compared with the top track pole 12, but if the track width of submicron order such as 0.2 μm is desired, the pole portion of the top pole 21 should be miniaturized in the order of submicrons.

Upon forming the top pole 21 into a desired pattern by plating, the photoresist has to be deposited on the top track pole 12 and insulating film 17, 20 having the step of more than 10 μm such that the photoresist has a uniform thickness. Then, the photoresist is subjected to the exposure of light to form the top pole 21 having the pole portion of submicron order. That is to say, a pattern of submicron order should be formed with the photoresist having a thickness of 8–10 μm. When the pole portion 21 is formed by plating, a seed layer made of permalloy serving as an electrode is previously formed. During the light exposure of the photolithography, light is reflected by the permalloy seed layer, and a desired pattern might be deformed. Therefore, it is quite difficult to form the pattern of submicron order precisely.

In order to improve the surface recording density, it is required to miniaturize the pole portion as explained above. Then, the miniaturized pole portion must be made of a magnetic material having a high saturation magnetic flux density. In general, FeN and FeCo have been known as magnetic materials having a high saturation magnetic flux density. However, these magnetic materials could not be easily formed by sputtering into a film having a given pattern. It has been known to shape the sputtered film into a given patter by the ion milling. However, etching rate is too slow and a track width of submicron order could not be controlled precisely.

NiFe, CoNiFe, FeCo have been known to have a high saturation magnetic flux density, and these magnetic materials could be formed into a given pattern by plating. For instance, Fe rich NiFe (more than 50%) has a saturation magnetic flux density of 1.5–1.6 tesla (T), and a composition could be controlled stably. However, in order to realize a surface recording density of 80–100 gigabits/inch$^2$, a track width has to be not larger than 0.2 $\mu$m. Then, there would be required to use a magnetic material having a higher saturation magnetic flux density. There has been proposed to form a magnetic film by plating using CoNiFe. However, this magnetic material could provide the magnetic faculty of about 1.8–2.0 T. In order to realize the surface recording density of about 80–100 gigabits/inch$^2$, it is desired to use a magnetic material having a high saturation magnetic flux density such as 2 T.

A high frequency performance of the induction type thin film magnetic head is also determined by a magnetic path length which is defined as a length from the throat height zero position to the back-gap. A high frequency performance of the thin film magnetic head is improved by shortening the above mentioned magnetic path length. It would be possible to shorten the magnetic path length by reducing a pitch of successive coil windings of the thin film coil, but this solution has a limitation. Then, there has been proposed to construct the thin film coil to have two coil layers as explained above. Upon forming the two-layer thin film coil, after forming a first thin film coil layer, an insulating film of photoresist is formed with a thickness of about 2 $\mu$m. This insulating layer has a round outer surface, and thus upon forming a second thin film coil layer, a seed layer for electrolytic plating has to be formed on an inclined portion. Therefore, when the seed layer is etched by the ion milling, a portion of the seed layer hidden by the inclined portion could not be removed sufficiently and coil windings might be short-circuited. Therefore, the second thin film coil has to be formed on a flat surface of the insulating layer.

For instance, it is now assumed that a thickness of the first thin film coil layer is 2–3 $\mu$m, a thickness of the insulating film formed on the first thin film coil layer is 2 $\mu$m, and an apex angle of the inclined portion of the insulating film is 45–55°, an outer surface of the second thin film coil layer must be separated from the throat height zero reference position by a distance of 6–8 $\mu$m which is twice of a distance from the throat height zero reference position to the outer surface of the first thin film coil layer. Then, a magnetic path length would be longer accordingly. When the thin film coil has space/line of 1.5 $\mu$m/05 $\mu$m and a total number of coil windings is eleven, six coil windings are provided in the first thin film coil layer and five coil windings are formed in the second thin film coil layer. Then, a length of the whole thin film coil becomes 11.5 $\mu$m. In this manner, in the known thin film magnetic head, a magnetic path length could not be shortened, and a high frequency property could not be improved.

In the known combination type thin film magnetic head explained above, there is a problem of miniaturizing the writing inductive type thin film magnetic head element. That is to say, by reducing the magnetic path length $L_M$, i.e. a length portions of the bottom pole 10 and top pole 21 surrounding the thin film coil 16, 19 as shown in FIG. 9, a flux rise time, non-linear transition shift NLTS and over write property of the inductive type thin film magnetic head element can be improved. In order to shorten the magnetic path length $L_M$, a coil width $L_C$ of a portion of the thin film coil 16, 19 surrounded by the bottom pole 10 and the top pole 21 has to be shortened. In the known thin film magnetic head, the coil width $L_C$ could not be shortened due to the following reason.

In order to shorten the coil width $L_C$ in t he known inductive type thin film magnetic head element, a width of coil windings of the thin film coil must be shortened, and at the same time, a distance between successive coil windings must be shortened. However, in order to reduce an electric resistance of the thin film coil, a width of coil winding should be shortened only with a limitation. When the thin film coil is made of copper having a high conductivity, a width of coil winding could not be reduced less than 1.5 $\mu$m, because a height of the thin film coil is limited to 2–3 $\mu$m. If a width of coil winding is shortened not larger than 1.5 $\mu$m, a property of the GMR film 15 might be deteriorated due to heat generated by the thin film coil. Furthermore, the bottom pole 10 and top pole 21 are also heated to expand and a serious problem of pole protrusion might occur and the thin film magnetic head might be brought into contact with the record medium. Therefore, in order to reduce the coil width $L_C$ without shortening a width of coil winding, a distance between successive coil windings must be shortened.

In the known thin film magnetic head, a distance between coil windings of the thin film coil 16, 19 could not be shortened. Now a reason of this will be explained. As explained above, the coil windings of the thin film coil are formed by the electrolytic plating method using the copper sulfate liquid. In order to deposit a copper film uniformly within the opening formed in the resist film formed on the seed layer, the seed layer is first formed with a thickness of 100 nm, and then the copper film deposited by the electrolytic plating on the seed layer through the opening formed in the resist film to form the coil windings. After that, the seed layer is selectively removed to separate the coil windings. The seed layer is removed by the ion beam milling using, for instance an argon gas, while the coil windings are used as a mask.

In order to remove the seed layer between successive coil windings, it is preferable to perform the ion beam milling from a direction perpendicular to the wafer surface. However, this result in a re-deposition of debris of the seed material and successive coil windings might not be separated well, and thus a distance between successive coil windings could not be shortened. Such a problem could be solved by effecting the ion beam milling at an angle of 5–10°, a sufficient ion irradiation could not be attained at a shadow portion of the photoresist film and the seed layer might be remained partially. Therefore, a distance between successive coil windings could not be shortened in order to prevent an insufficient insulation between coil windings. In the known thin film magnetic head, a distance between successive coil windings is long such as 0.3–0.5 $\mu$m. If a distance between successive coil windings is shortened less than the above value, the above mentioned problem might occur.

When the thin film coil 16, 19 is formed by the electrolytic plating method as explained above, in order to keep a thickness of the thin film coil uniformly, a plating liquid such as a copper sulfate must be stirred during the plating. If a width of a wall defining the opening in the photoresist film is shorted in order to shorten a distance between successive coil windings, the thin wall might be broken due to the stirring of the plating liquid. Then, the thin film coil could not be formed accurately. Also from this point of view, a distance between successive coil windings of the thin film coil could not be shortened.

The NLTS property of the inductive type thin film magnetic head could be improved by increasing the number of coil windings of the thin film coil. In order to increase the number of coil windings without increasing the magnetic path length, the number of thin film coil layers has to be increased to four or five layers. However, then an apex angle might be increased and a narrow track width could not be attained. In order to keep an apex angle within a given range, it is preferable to limit the number of thin film coil layers to not larger than three, preferably two. Then, the number of coil windings could not be increased and the NLTS property could not be improved.

Furthermore, when two thin film coil layers are provided as explained above, the second layer thin film coil 19 could not be formed perpendicularly, because the insulating film 17 is not flat, but is inclined at a peripheral portion of the second layer thin film coil. For instance, when a thin film coil having a space not larger than 0.3 μm with a thickness not less than 1.5 μm, argon ions could not effectively go onto the seed layer 18 between successive coil windings at a portion in which the thin film coil is not formed perpendicularly. Moreover, since an angle of the ion milling differs between a central portion and a peripheral portion of the wafer, the seed layer 18 could not be removed sufficiently and might be remained partially. When a space between successive coil windings is short, even if argon particles enter into this narrow space, Cu particles carried out together with argon particles might be deposited on side wall of the coil windings. Such etching debris might short-circuit the coil windings.

In Japanese Patent Application Laid-open Publication Kokai Sho 55-41012, there is disclosed a thin film coil, in which first and second thin film halves are arranged alternately with interposing therebetween an insulating film. In FIG. 7 of the Publication, there is shown a thin film coil, in which first and second thin film coils of a first layer thin film coil are formed as coils of anti-clockwise direction, and first and second thin film coil halves of a second layer thin film coil are formed as coil of a clockwise direction, and inner contact pads are connected to each other and outer contact pads are connected to each other such that an electric current flows in a same direction. However, in this known thin film coil, after forming the first thin film coil half, an insulating film and a conductive film are formed on a whole surface by sputtering or vacuum deposition, and a mask is formed selectively on the conductive film. After that, a portion of the conductive film formed above the first thin film coil half is selectively etched such that a portion of the conductive film deposited in a space between successive coil windings of the first thin film coil half is remained to form the second thin film coil half. Therefore, the first and second thin film coil halves are not formed in a self-aligned manner and a distance between successive coil windings could not be shortened in the order of submicrons.

One of the inventors of the present application has proposed in U.S. Pat. Nos. 6,191,916 and 6,204,997 a method of manufacturing a thin film coil, in which after forming a first thin film coil half by the electrolytic plating process using a seed layer, a thin insulating film and a seed layer are formed on a whole surface, a photoresist film having openings at portions corresponding to spaces of successive coil windings of the first thin film coil half is formed, and a second thin film coil half is formed by the electrolytic plating process using the photoresist film as a mask. In this method of manufacturing the thin film coil, the first and second thin film coil halves can be formed accurately by the electrolytic plating.

However, since use is made of the photoresist film having a given patter of openings for forming the second thin film coil half, the first and second thin film coil halves could not be formed in a self-aligned manner. Therefore, it is difficult to shorten a space between successive coil windings in the order of quartermicrons.

The above explained problems occur not only in the thin film magnetic head, but also in case of forming fine conductive patterns in the semiconductor integrated circuits. When it is required to form a plurality of fine conductive strips of submicrons, particularly quartermicrons in parallel with each other, it is desired to shorten a space between successive conductive strips to decrease a surface area occupied by the conductive pattern. Particularly, when conductive strips having a rather large thickness are formed with a narrow space, a conductive material has to be embedded into depressions having a large aspect ratio. However, the known manufacturing methods suitable for a mass production could not satisfy such a requirement. Moreover, a width of conductive strips must be set to a value required in respective applications, and same times it is advantageous that a conductive pattern includes both wide conductive strips and narrow conductive strips. However, such a structure of conductive pattern could not be manufactured by the conventional methods.

SUMMARY OF THE INVENTION

The present invention has for its object to provide a conductive pattern having a plurality of conductive strips which are separated by a narrow space, and more particularly to a conductive pattern including a plurality of wide conductive strips separated by a narrow space and a plurality of narrow conductive strips separated by a narrow space. The present invention has for its object to provide a method of manufacturing such conductive pattern.

It is another object of the present invention to provide a thin film magnetic head and a combination type thin film magnetic head, in which a coil width $L_C$ is shortened by decreasing a space between successive coil windings and a magnetic path length $L_M$ is shortened to improve a performance of the head.

It is further object of the invention to provide a method of manufacturing easily and precisely a thin film magnetic head and a combination type thin film magnetic head, in which a coil width $L_C$ is shortened by decreasing a space between successive coil windings and a magnetic path length $L_M$ is shortened to improve a performance of the head.

According to the invention, a conductive patter comprises:

a substrate having an electrically insulating surface;

a plurality of first conductive strip halves having a given width and being arranged on the surface of the substrate such that the first conductive strip halves are separated from each other to form depressions having a given width;

a first insulating film formed on the surface of the substrate and surfaces of the depressions formed between successive first conductive strip halves;

a plurality of second conductive strip halves formed on the first insulating film such that said depressions formed between successive first conductive strip halves are filled with the second conductive strip halves;

a second insulating film formed on a portion of the surface of the substrate at which said first and second conductive strip halves are not formed; and a third insulating film formed on a coplanar flat surface of the first and second conductive strip halves, an end surface of the first insulting film formed on the surfaces of the depressions and a surface of the second insulating film.

According to the invention, a method of manufacturing such a conductive pattern comprises the steps of:

forming a plurality of first conductive strip halves having a given width on an electrically insulating surface of a substrate such that the first conductive strip halves are separated from each other to form depressions having a given width;

forming a first insulating film on the surface of the substrate and surfaces of the depressions formed between successive first conductive strip halves;

forming a resist selectively on areas at which said first conductive strip halves are formed;

forming a second insulating film on a portion of the surface of the substrate which are not covered with the resist;

forming, after removing said resist, a conductive film such that the depressions formed between successive first conductive strip halves are filled with the conductive film;

polishing the conductive film, the first and second insulating films formed on the first conductive strip halves such that the first conductive strip halves are exposed to form a plurality of second conductive strip halves embedded in said depressions formed between successive first conductive strip halves; and forming a third insulating film on a coplanar flat surface of the first and second conductive strip halves and the second insulating film, said coplanar surface being formed by said polishing.

In the manufacturing method according to the invention, the first conductive strip halves may be formed by a copper plating process and the second conductive strip halves may be formed by Cu-CVD, or the first and second conductive strip halves may be formed by a copper plating process. Since Cu-CVD has a superior step coverage, it is preferable to form the second conductive strip halves by Cu-CVD when it is required to form the second conductive strip halves having a narrow width and a large thickness.

According to a further aspect of the invention, a conductive pattern comprises:

a substrate having an electrically insulating surface;

a plurality of first conductive strip halves of a first conductive strip group, said first conductive strip halves having a second width and being arranged on the surface of the substrate such that the first conductive strip halves are separated from each other to form depressions having a first width;

a plurality of first conductive strip halves of a second conductive strip group, said first conductive strip halves having a fourth width larger than the second width and being arranged on the surface of the substrate such that the first conductive strip halves are separated from each other to form depressions having a third width larger than the first width;

a first insulating film formed on the surface of the substrate and surfaces of the depressions formed between successive first conductive strip halves of the first and second conductive strip groups;

a second insulating film formed on a portion of the surface of the substrate at which said first conductive strip halves of the first and second conductive strip groups are not formed;

a plurality of second conductive strip halves of the first conductive strip group formed on the first insulating layer such that said depressions formed between successive first conductive strip halves of the first conductive strip group are filled with the second conductive strip halves of the second conductive strip group;

a plurality of second conductive strip halves of the second conductive strip group formed on the first insulating film such that said depressions formed between successive first conductive strip halves of the second conductive strip group are filled with the second conductive strip halves of the second conductive strip group, each of said second conductive strip halves of the second conductive strip group having a two-layer structure having a first conductive film formed by CVD and a second conductive film formed by electrolytic plating; and a third insulating film formed on a coplanar flat surface of the first and second conductive strip halves of the first conductive strip group, the first and second conductive strip halves of the second conductive strip group and the second insulting film.

According to the present invention, a method of manufacturing the above mentioned conductive pattern comprises the steps of:

forming, on an electrically insulating surface of a substrate, a plurality of first conductive strips having a second width and being arranged such that said first strips are separated from each other to form depressions having a first width, and a plurality of second conductive strips having a fourth width larger than said second width and being arranged such that the second conductive strips are separated from each other to form depressions having a third width larger than the first width;

forming a first insulating film formed on the surface of the substrate and surfaces of the first and second conductive strips;

forming a covering film selectively on a region in which said first and second conductive strips are formed;

forming a second insulating film on a region in which the first and second conductive strips are not formed;

forming, after removing said covering film, a first conductive film by CVD on said first insulating film such that the depressions formed between said first conductive strips are completely filled with the first conductive film and the depressions formed between said second conductive strips are partially filled with the first conductive film;

forming a second conductive film by electrolytic plating on the first conductive film such that the depressions formed between successive second conductive strips are completely filled;

polishing said first and second conductive films, a portion of said first insulating film covering the surfaces of the first and second conductive strips such that surfaces of the first and second conductive strips are exposed to form a plurality of third conductive strips arranged in said depressions formed between successive first conductive strips and made by said first conductive film and to form a plurality of fourth conductive strips arranged in said depressions formed between successive second conductive strips and having a two-layer structure composed of the first conductive film formed by CVD and the second conductive film formed by electrolytic plating; and forming a third insulating film on a coplanar flat surface of the first, second, third and fourth conductive strips and the second insulating film.

According to the invention, a thin film magnetic head including a substrate and at least an inductive type thin film magnetic head element supported by the substrate;

wherein said inductive type thin film magnetic head element comprises;

a bottom pole made of a magnetic material which extends inwardly from an air bearing surface;

a bottom track pole made of a magnetic material which extends inwardly from the air bearing surface over a distance corresponding to a track pole;

a bridge portion made of a magnetic material and formed on one surface of the bottom pole such that a back gap is formed at a position remote from the air bearing surface;

a thin film coil formed on the surface of the bottom pole such that a surface of the thin film coil opposite to the bottom pole forms a coplanar flat surface together with a surface of the bottom track pole;

a write gap film made of a non-magnetic material and formed on said coplanar flat surface of said bottom track pole and thin film coil to have a flat surface; and a top pole formed on a surface of the write gap film opposite to the bottom track pole and including a top track pole aligned with the bottom track pole, said top pole being brought into contact with the bridge portion;

wherein said thin film coil comprises:

a first thin film coil half having coil windings mutually separated by a given distance;

a second thin film coil half having coil windings which are formed between successive coil windings of the first thin film coil half in a self-aligned manner, at least a part of each of the coil windings of the second thin film coil half having a two-layer structure consisting of a first conductive film formed by CVD and a second conductive film formed by electrolytic plating;

an insulating film formed to embed spaces between successive coil windings of the first and second thin film coil halves;

a first jumper wiring connecting electrically an innermost coil winding of one of the first and second thin film coil halves to an outermost coil winding of the other of the first and second thin film coil halves; and a second jumper wiring having one end connected to an innermost coil winding of the other of the first and second thin film coil halves.

In the thin film magnetic head according to the invention, it preferable that the coil windings of the first thin film coil half are formed by electrolytic plating of copper and the coil windings of the second thin film coil half are constructed as a two-layer structure of the first conductive film formed by Cu-CVD and the second conductive film formed by plating of copper. In this case, portions of the coil windings of the second thin film coil half formed between the track pole and the bridge portion have a narrow width, and therefore these portions are wholly made of the first conductive film formed by electrolytic plating of copper and portions of the coil windings of the second thin film coil half having a wide width are formed by the two-layer structure of the first conductive film formed by plating of copper and the second conductive film formed by Cu-CVD. Furthermore, the insulating film provided between successive coil windings of the first and second thin film coil halves has a preferably a thickness of 0.03–0.25 μm. This insulating film may be made of an inorganic material such as alumina, silicon oxide and silicon nitride, and more particularly the insulating film may be preferably made of alumina-CVD.

As explained above, in the thin film magnetic head according to the invention, since the thin film coil is formed by the first and second thin film coil halves and spaces between successive coil windings of the first thin film coil half are set to a value slightly larger than a width of the coil windings, successive coil windings of the second thin film coil half can be formed in these spaces in a self-aligned manner. Therefore, distances between successive coil windings of the first and second thin film coil halves can be extremely shortened and a magnetic path length can be shortened. Then, characteristics such as the flux rise time property, NLTS property and over write property can be improved.

In the thin film magnetic head according to the invention, a space between successive coil windings of the first and second thin film coil halves may be preferably not larger than 0.2 μm, and more particularly may be preferably set to a value within a range of 0.03–0.15 μm. If a space between successive coil windings is smaller than 0.03 μm, the coil windings could not be isolated well. If a space between successive coil windings is larger than 0.2 μm, a magnetic path length of the thin film magnetic head could not be shortened effectively. As explained above, according to the present invention, by reducing a space between successive coil windings to not larger than 0.2 μm, particularly to a value within a range of 0.03–0.15 μm, a magnetic path length can be shortened less than a half of the conventional thin film magnetic head illustrated in FIG. 9 without decreasing a width of coil windings. According to the invention, a magnetic path length can be shorter than that of the inductive type thin film magnetic heads disclosed in the above mentioned U.S. Pat. Nos. 6,191,916 and 6,204,997. In this manner, the performance of the thin film magnetic head can be improved to a large extent.

In the thin film magnetic head according to the invention, it is preferable that said bottom track pole and top track pole are formed by RIE (Reactive Ion Etching) in a self-aligned manner and the surface of the bottom pole is partially etched to construct a trim structure. Furthermore, the top track pole and top pole may be preferably made of FeN, FeCo, CoNiFe, FeAlN or FeZrN, and the bottom track pole may be preferably made of FeN, FeCo, CoNiFe, FeAlN, FeZrN or NiFe. In this case, CoNiFe, FeCo and NiFe may be formed as a plating film, and FeN, FeCo, FeAlN and FeZrN may be formed as a sputtering film.

According to the invention, a method of manufacturing a thin film magnetic head including at least an inductive type thin film magnetic head element supported by a substrate;

wherein a process of forming said inductive type thin film magnetic head element comprises the steps of:

forming a first magnetic material film constituting a bottom pole such that the first magnetic material film is supported by the substrate;

forming, on said first magnetic material film, a second magnetic material film constituting a bottom track pole and a bridge portion of back gap; forming, on said first magnetic material film, a thin film coil in an isolated manner;

polishing surfaces of said second magnetic material film and thin film coil to form a coplanar flat surface;

forming a write gap film made of a non-magnetic material on said coplanar flat surface such that the write gap film has a flat surface;

forming, on the flat surface of said write gap film, a third magnetic material film constituting a top track pole and a top pole;

forming a mask on a portion of the third magnetic material film at which a top track pole is to be formed;

etching selectively said third magnetic material film such that a top track pole is formed and removing selectively a portion of the write gap film near the top track pole as well as the underlying second magnetic material film to form a bottom track pole; and forming an overcoat film made of an insulating material on a whole surface;

wherein said step of forming the thin film coil comprises the steps of:

forming, on said first magnetic material film, a plurality of coil windings of the first thin film coil half isolated from the first magnetic material film to form depressions such that portions of the depressions surrounded by said bottom pole, bottom track pole, top track pole, top pole and bridge portion have a narrower width than the remaining portions of the depressions;

forming a first insulating film all over the first thin film coil half;

forming, on said first insulating film, a first conductive film by CVD such that said portions of the depressions formed between successive coil windings of the first thin film coil half having a narrower width are completely filled with said first conductive film and said remaining portions of the depressions having a wider width are partially filled with said first conductive film;

forming, on a portion of said first conductive film at which the thin film coil is to be formed, a second conductive film by electrolytic plating such that said remaining portion of the depressions having a wider width are completely filled with first and second conductive films;

forming a second insulating film on a whole surface; and polishing said first and second conductive films, first insulating film covering surfaces of the coil windings of the first thin film coil half, and second insulating film to expose the surface of the coil windings of the first thin film coil half and form coil windings of a second thin film coil half arranged between successive coil windings of the first thin film coil half;

wherein prior to forming said third magnetic material film, contact portions provided at ends of innermost and outermost coil windings of the first and second thin film coil halves are exposed, during the formation of the third magnetic material film, a first jumper wiring for electrically connecting a contact portion at an end of an innermost coil winding of one of the first and second thin film coil halves to an outermost coil winding of the other of the first and second thin film coil halves and a second jumper wiring connected to a contact portion at an end of an innermost coil winding of the other of the first and second thin film coil halves are formed with a same magnetic material as that of the third magnetic material film.

In a preferable embodiment of the method of manufacturing a thin film magnetic head according to the invention, said first thin film coil half is formed by Cu-plating, said first conductive film of the second thin film coil half is formed Cu-CVD and the second conductive film is formed by Cu-plating. In this case, prior to forming the second conductive film by Cu-plating, a portion of the first conductive film except for a thin film forming area is covered with a resist, and after forming the second conductive film, the resist is removed to expose the first conductive film partially and exposed portions of the first conductive film is selectively removed using the second conductive film as a mask. The selective removing of the first conductive film may be performed by a dry etching such as ion milling and high temperature RIE or by a wet etching using a diluted sulfuric acid or hydrochloric acid or by an electrolytic etching using a copper sulfate solution.

Furthermore, after forming the second conductive film constituting the coil windings of the second thin film coil half and forming a second insulating film on the second conductive film, the second conductive film and second insulating film may be polished by CMP using an alkaline slurry or a neutral slurry or by a dry etching such as ion beam milling and sputter etching. Alternatively, the second conductive film and second insulating film may be first etched roughly by CMP and then may be precisely etched by a dry etching.

Moreover, a coil winding which situates most closer to the air bearing surface is preferably formed by the outermost coil winding of the second thin film coil half and a coil winding which situates most closer to the bridge portion constituting the back gap may be formed by the innermost coil winding of the second thin film coil half. In this case, a width of the outermost and innermost coil windings of the second thin film coil half is preferably larger than that of the remaining coil windings. Then, even if a position of the first thin film coil half is deviated, a width of these outermost and innermost coil windings might not be small and a resistance value might not increase excessively.

In a preferable embodiment of the method of manufacturing a thin film magnetic head according to the invention, during said etching process, RIE is continued after the bottom track pole is formed to remove the write gap film selectively, and further the bottom pole is partially etched over a part of its thickness to form a trim structure in a self-aligned manner. In this case, since the third magnetic material film constituting the top track pole and top pole is formed on the flat surface of the write gap film to have a flat surface, the top track pole and bottom track pole having a narrow width of submicron order can be formed very accurately. The third magnetic material film may be advantageously made of FeN, FeCo, CoNiFe, FeAlN or FeZrN, and the bottom track pole may be preferably made of FeN, FeCo, CoNiFe, FeAlN, FeZrN or NiFe. In this case, CoNiFe, FeCo and NiFe may be formed as a plating film, and FeN, FeCo, FeAlN and FeZrN may be formed as a sputtering film. RIE for removing the bottom track pole and top track pole may be preferably performed at a high etching temperature above 50° C., particularly 200–300° C. under an atmosphere of $Cl_2$ or a mixed gas of $Cl_2$ and boron series gas such as $BCl_2$ or a mixed gas of $Cl_2$ and an inert gas such as Ar and $N_2$.

In the method of manufacturing a thin film magnetic head according to the invention, it is preferable that said first insulating film for isolating the first and second thin film coil halves may be preferably formed by alumina-CVD. The alumina-CVD may be preferably a reduced pressure $Al_2O_3$-CVD film formed by an atomic layer process, in which $AlCl_3$ and $H_2O$, $N_2$, $N_2O$ or $H_2O_2$ are alternately projected intermittently under a reduced pressure of 1–2 Torr at a temperature of 100–400° C., preferably 150–200° C. In order to avoid a deterioration of magnetic materials by a heating process, it is preferable that a heating temperature is not higher than 300° C. However, if a heating time is short, a higher temperature of, for instance 400° C. does not cause a serious problem. In this manner, it is possible to obtain the insulating film which has an excellent electrically insulating property as well as a superior step-coverage although the insulating film has a large thickness.

BRIEF DESCRIPTION OF THE DRAWINGS

FIGS. 1A, 1B–8A, 8B are cross sectional views showing successive steps of a known method of manufacturing a known thin film magnetic head;

FIGS. 10A, 10B–16A, 16B are cross sectional views illustrating successive steps of the method of manufacturing a first embodiment of the thin film magnetic head according to the invention;

FIGS. 18A, 18B–20A, 20B are cross sectional views depicting succeeding steps;

DESCRIPTION OF THE PREFERRED EMBODIMENTS

Figure 3A:
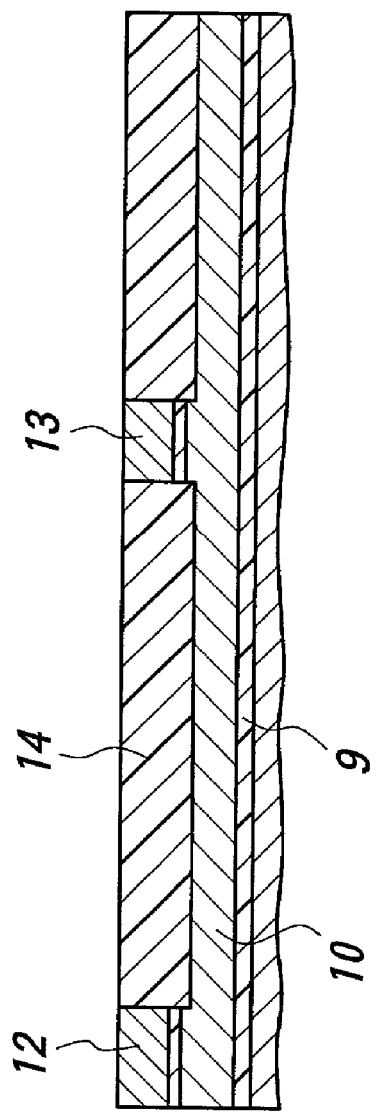
Figure 3B:
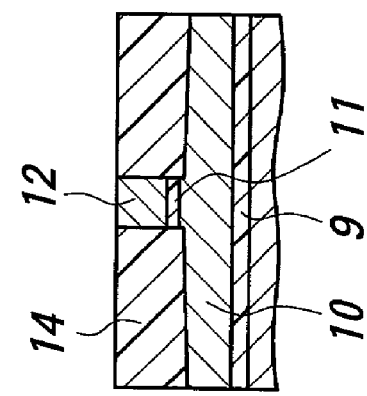
Figure 4B:
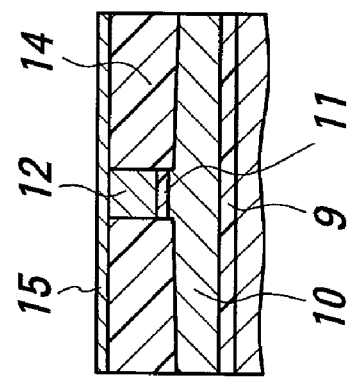
Figure 4A:
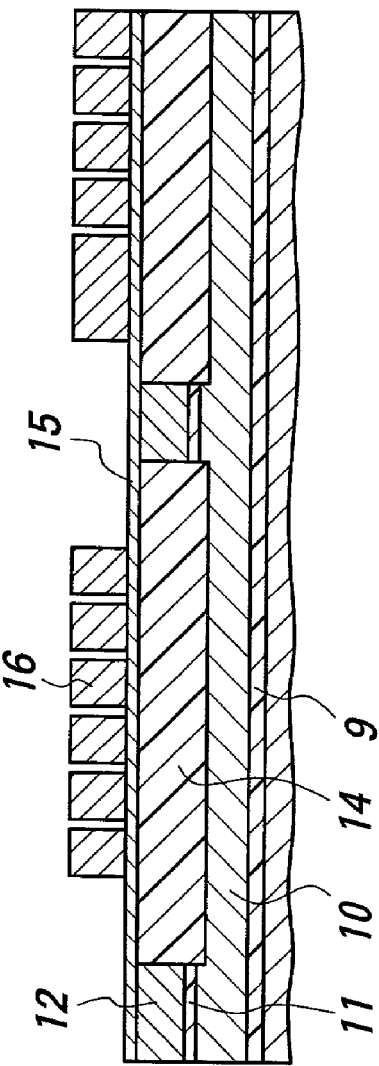
Figure 9:
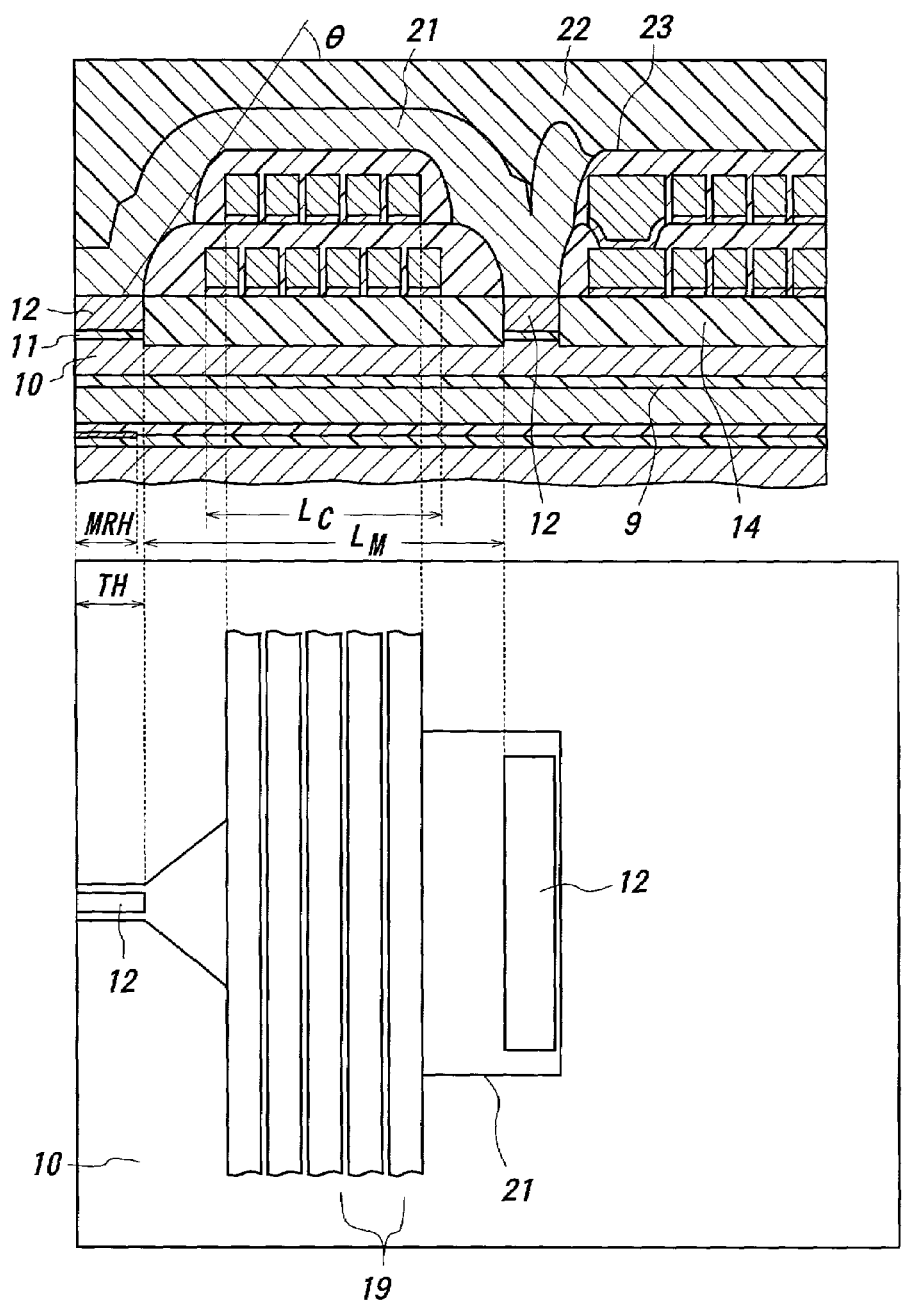
FIG. 9 is a cross sectional and plan view, respectively illustrating the known thin film magnetic head.

FIGS. 10–22 are cross sectional and plan views showing successive steps of the method of manufacturing a first embodiment of the combination type thin film magnetic head according to the invention. In these drawings, A denotes a cross sectional view cut along a line perpendicular to the air bearing surface, and B represents a cross sectional view of a pole portion cut along a line parallel to the air bearing surface. It should be noted that the structure of a reading GMR head element formed by a magnetoresistive type thin film magnetic head and the method of manufacturing the same are substantially identical with those of the known head. As illustrated in FIGS. 10A and 10B, an insulating film 32 made of alumina and having a thickness of about 3 μm is deposited on one surface of a substrate 31 made of AlTiC. Furthermore, a bottom shield film 33 made of a permalloy for the magnetoresistive type thin film magnetic head is formed on the insulating film with a thickness of about 2–3 μm into a desired pattern by means of a plating method using a photoresist mask.

Subsequently, after forming an alumina film on a whole surface of the wafer with a thickness of 3–4 μm, a surface the alumina film is flattened by CMP to expose the bottom shield film. Next, after forming a bottom shield gap film 34 made of alumina with a thickness of 30–35 nm by sputtering, a GMR film 35 having a given layer-structure and lead electrodes 36 for the GMR film are formed by a lift-off process. Then, a top shield gap film 37 is formed with a thickness of 30–35 nm by sputtering of alumina, and a top shield film 38 for the GMR head element is formed with a thickness of about 1–1.5 μm.

Next, an isolation film 39 made of alumina is formed with a thickness of about 0.15–0.3 μm for isolating the reading GMR head element from a writing inductive type thin film magnetic head element to suppress noise in a reproduced output from the GMR head element. After that, a magnetic material film 40 for constituting a bottom pole of the recording head element is formed with a thickness of 0.5–2.0 μm. The magnetic material film 40 may be formed by a plating film of NiFe (80%:20%), NiFe (45%:55%), FeCo (67%:33%) or CoNiFe (64%:18%;18%) or may be formed by a sputtering film of FeAlN, FeN, FeCo or FeZrN. In the present embodiment, the magnetic material film is formed by a plating film of CoNiFe (64%:18%;18%).

Next, a magnetic material film 42 made of CoNiFe is formed on the magnetic material film 40 with a thickness of 1.5 μm by an electrolytic plating process, and furthermore a magnetic material film 41 made of CoFe is formed on the magnetic material film 42 with a thickness of 1.0 μm by an electrolytic plating process. As explained later, the magnetic material film 41 constitutes a bottom track pole and the magnetic material film 41 constitutes a bottom pole together with the magnetic material film 40. During the formation of the magnetic material film 42, a first bridge portion 43a at a back gap, and during the formation of the magnetic material film 41, a second bridge portion 43b is formed.

Figures 11A, 11B:
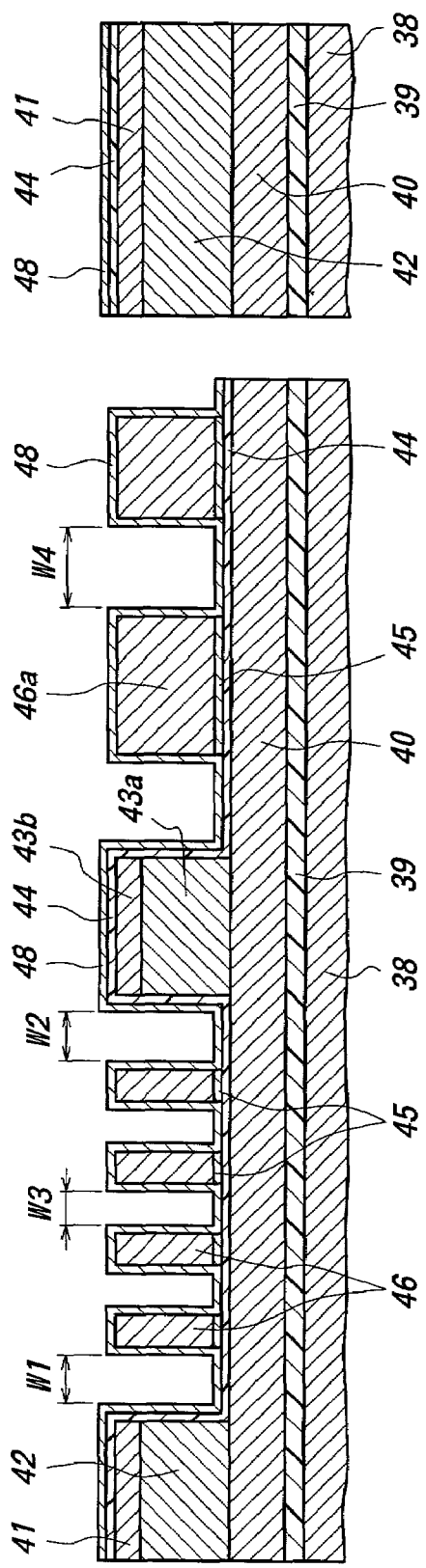

Next, an insulating film 44 made of alumina is formed on a whole surface with a thickness of 0.2 μm, and a seed film 45 made of copper is formed on the insulating film with a thickness of 50 nm. After forming a resist mask having a given pattern on the seed film 45, a first thin film coil half 46 is formed by an electrolytic plating process with a thickness of 2.0–3.0 μm. After removing the resist mask and exposed portions of the seed film 45, an alumina insulating film 48 is formed on a whole surface with a thickness of 0.1 μm as illustrated in FIG. 11. According to the invention, this alumina insulating film 48 may have a thickness of 0.03–0.25 μm. Since a magnetic path length is determined by a thickness of the alumina insulating film 48, it is preferable to reduce a thickness of the alumina insulating film as small as possible. In the known method of manufacturing the thin film magnetic head, a space between successive coil windings is shorter than 250 nm, during the etching process for removing the exposed portion of the seed film, coil windings might be short-circuited by debris of etched seed film material. According to the invention, such a short-circuit can be effectively prevented. If a thickness of the alumina insulating film 48 is smaller than 30 nm, during a CMP process for the first thin film coil halve formed by Cu-plating and a second thin film coil half to be formed by Cu-CVD and Cu-plating, a smear phenomenon in which copper fine particles move between these thin film coil halves might occur easily and the coil windings might be short-circuited.

In the present embodiment, in a portion of the thin film coil surrounded by the bottom pole and the top pole, innermost and outermost coil windings are formed by a second thin film coil half, and a width of these coil windings is larger than that of the remaining coil windings. To this end, a distance W1 between the outermost coil winding of the first thin film coil half 46 and the magnetic material films 41, 42 and a distance W2 between the innermost coil winding of the first thin film coil half 46 and the bridge portions 43a, 43b are larger than a width W3 of the remaining portions. In the present embodiment, W1=W2=0.18 μm and W3=0.08 μm, and a width of the innermost and outermost coil windings is larger than that of the remaining coil windings by 0.1 µm. According to the invention, this difference in a width of coil windings may be set to 0.1–0.3 µm.

Now a reason for setting the condition of W1, W2>W3 will be explained hereinbelow. As mentioned above, the first thin film coil half 46 is formed using the resist mask. A position of the resist mask relative to the wafer might deviate. For instance, if the resist mask shifts toward the air bearing surface, a distance W1 between the outermost coil winding of the first thin film coil half 46 and the end faces of the magnetic material films 41, 42 is shortened, and if the resist mask shifts in a direction away from the air bearing surface, a distance W2 between the innermost coil winding of the first thin film coil half 46 and the bridge portions 43*a*, 43*b* constituting the back gap is shortened. If the distance W1 or W2 is shortened by a misalignment, a width of outermost or innermost coil winding of the second thin film coil half is decreased and a resistance becomes higher than a give value. Particularly, the outermost coil winding has a longer length than the remaining coil windings, and thus if its width W1 is shortened, a resistance value becomes extremely high and an undesired heat generation might occur. If such a heat generation occurs near the air bearing surface, the pole chip might protrude outwardly (pole protrusion) and might be contacted with a record medium. When W1, W2>W3 is satisfied, although a position of the resist mask for forming the first thin film coil half 46 is deviated, a width of the outermost and innermost coil windings of the second thin film coil half is never smaller than a given width, and the above mentioned problem of pole protrusion can be effectively avoided. Furthermore, upon forming the first thin film coil half 46, since the distances between the outermost and inner coil windings of the first thin film coil half and the magnetic material films 41, 42 and bridge portions 43*a*, 43*b* are long, undesired light reflection from the magnetic material films and bridge portions during a light exposure of a photolithography can be suppressed, and therefore the photolithography can be performed easily and accurately.

In order to shorten a magnetic path length, a width of portions of coil windings of the thin film coil halves between the pole chip and the back gap is made smaller than a width of the remaining portions of coil windings. That is to say, in FIG. 11, a width W4 of depressions formed on a side of the bridge portions 43*a*, 43*b* remote from the air bearing surface is longer than the above mentioned widths W1, W2 and W3. It should be noted that in the drawing a ratio of these widths is not correctly shown, but a relation of the widths is merely expressed.

In the present embodiment, the alumina insulating film 48 is formed by CVD. That is to say, the alumina insulating film is preferably formed by an atomic layer process, in which a CVD chamber having the wafer installed therein is kept at a temperature of 100–400° C. under a reduced pressure state of 1–2 Torr, and $Al(CH_3)_3$ or $AlCl_3$ and $H_2O$, $N_2$, $N_2O$ or $H_2O_2$ are alternately projected intermittently to deposit an alumina by a chemical reaction. In the present embodiment, the reduced pressure alumina-CVD film 48 is formed by projecting a steam ($H_2O_2$) and $Al(CH_3)_3$ alternately at a rate of once a second to the chamber kept at 250° C. under a reduced pressure of 1.5 Torr. Such an alumina-CVD film 48 has an excellent electrically insulating property as well as a superior step-coverage. Furthermore, a Cu-CVD film 49 is formed on a whole surface of the alumina-CVD film 48 with a thickness of 50–500 nm as shown in FIG. 12.

After forming a resist 50 having a given pattern on the Cu-CVD film 49, as depicted in FIG. 13, an electrolytic plating film of copper 51 (refer to Cu-P film for the sake of simplicity) is formed with a thickness of 2.5 µm on an area at which the thin film coil is to be formed, while the Cu-CVD film 49 is utilized as a seed film.

Figure 16B:
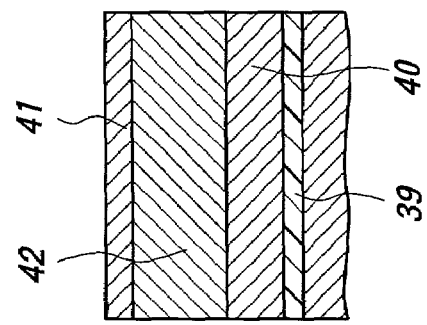
Figure 16A:
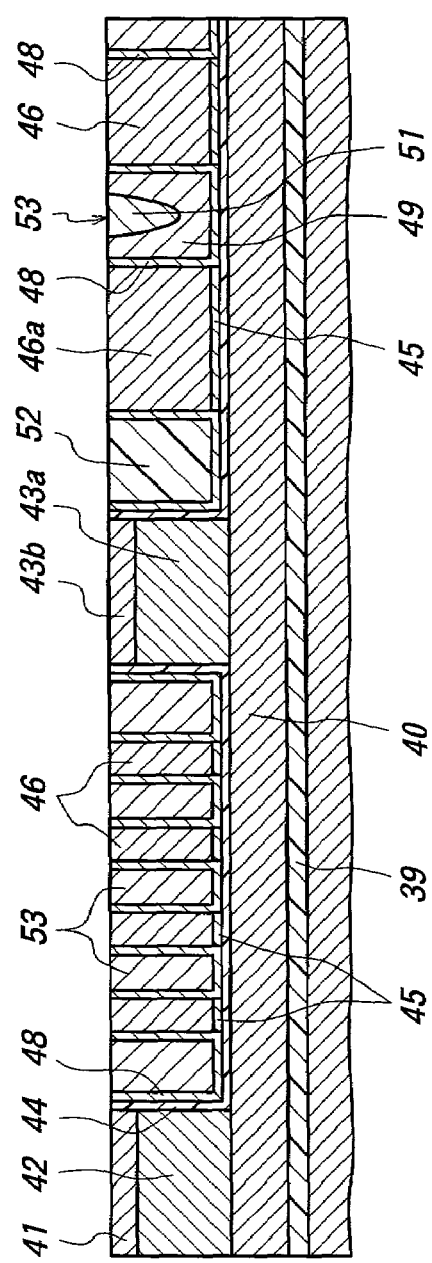

Next, after removing the resist 50 to expose the Cu-CVD film 49 partially, the exposed Cu-CVD film 49 is removed as shown in FIG. 14 by means of a dry etching such as ion milling and high temperature RIE or by a wet etching using a diluted sulfuric acid solution or a diluted hydrochloric acid solution or by an electrolytic etching within a copper sulfate solution. Then, as illustrated in FIG. 15, an alumina insulating film 52 is formed on a whole surface with a thickness of 3–4 µm, and after that a protruded portion of the alumina insulating film on the copper plating film (Cu-P film) 51 is flattened by CMP. FIG. 16 shows a condition in which the alumina insulating film 52, Cu-P film 51, Cu-CVD film 49 and alumina-CVD film 48 are polished to form a flat coplanar surface. This CMP process may be performed using an alkaline slurry or a neutral slurry or by a dry etching such as ion beam milling and sputter etching. Alternatively, the films may be first etched roughly by CMP and then may be precisely etched by a dry etching.

Figure 17A:
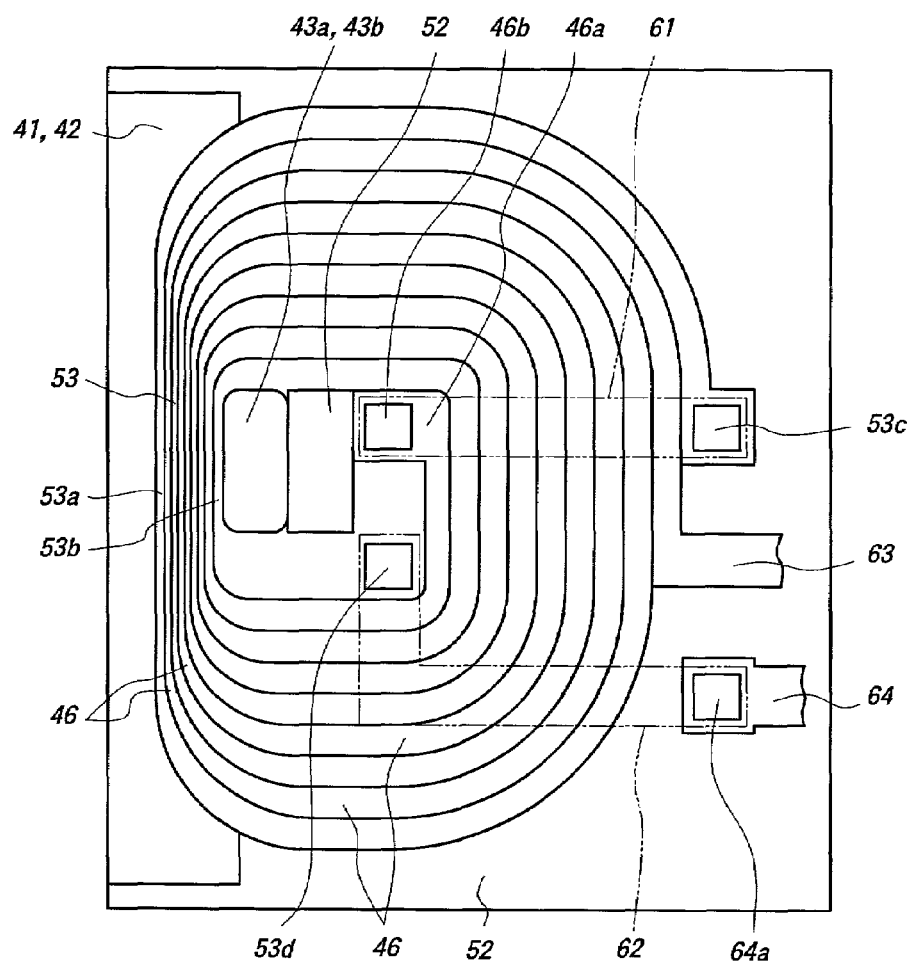
FIGS. 17A and 17B are plan view and cross sectional view, respectively showing the arrangement of first and second thin film coil halves and first and second jumper wirings connecting the coils.
Figure 17B:
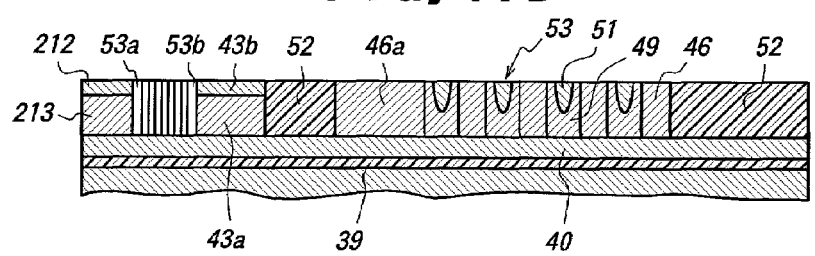

In the manner explained above, the first thin film coil half 46, magnetic material film 41, second bridge portion 43*b* and alumina insulating film 52 are exposed, and at a same time, a second thin film coil half 53 is formed in a self-aligned manner between successive coil windings of the first thin film coil half 46 with interposing the alumina-CVD film 48 therebetween as shown in a plan view of FIG. 17A as well as in a cross sectional view of FIG. 17B. It should be noted that in FIG. 17B, the insulating films 44 and 48 are denoted by thick lines. As explained above, since W1, W2>W3, a width of an outermost coil winding 53*a* and an innermost coil winding 53*b* of the second thin film coil half 53 is larger than a width of the remaining coil windings. Furthermore, an end portion of the innermost coil winding 46*a* which will constitute a wiring contact has a wider width. A wiring 63 which is connected to an end portion of the outermost coil winding of the first thin film coil half 46 and extends up to a first contact pad and a wiring 64 which conducts the innermost coil winding of the second thin film coil half to a second contact pad via a jumper wiring to be formed later are formed simultaneously with the first thin film coil half 46. An alumina insulating film 52 is remained between the bridge portions 43*a*, 43*b* constituting the back gap and the innermost coil winding of the first thin film coil half 46. This alumina insulating film 52 may have a width of 3–5 µm.

A width of portions of the first and second thin film coil halves 46 and 53 surrounded by the magnetic material films 41, 42 and the bridge portions 43*a*, 43*b* is smaller than that of the remaining portions to shorten a magnetic path length. According to the invention, as stated above, the Cu-CVD film 49 is formed such that the depressions formed between successive coil windings of the first thin film coil half 46 are embedded therewith, and the Cu-P film 51 is formed on the Cu-CVD film 49. In a depression having a narrow width, the depression is embedded only with the Cu-CVD film 49 due to a lateral growth of Cu-CVD from side walls of the depression. However, a depression having a wide width is not filled with the Cu-CVD film 49 and a part of the depression is filled with the Cu-P film 51. Therefore, as shown in a cross sectional view of FIG. 17B, a portion of a coil winding having a narrow width is formed solely by the Cu-CVD film 49 and a portion of the coil winding having a wide width is formed by both the Cu-CVD film 49 and Cu-P film 51.

Next, as illustrated in FIG. 18, after forming a photoresist mask 54 selectively on the second bridge portion 43*b* and the end portions of the innermost coil windings of the first and second thin film coil halves 46 and 53, an alumina insulating film 55 constituting a write gap film is formed with a thickness of 0.1 μm.

Figures 19A, 19B:
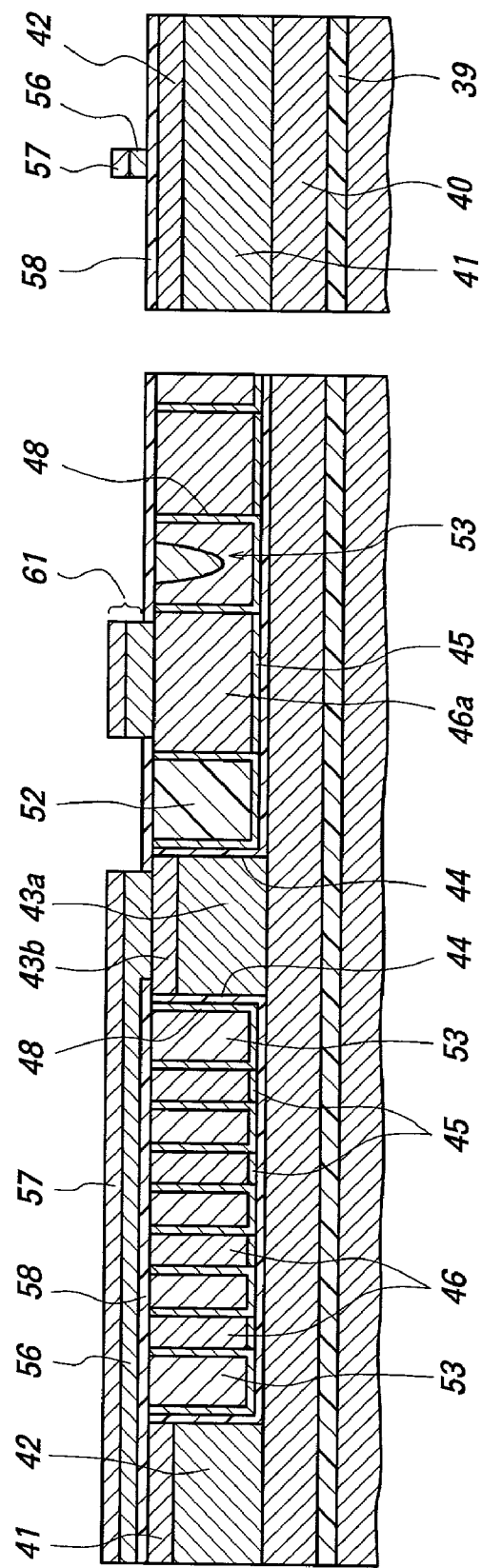

Next, as depicted in FIG. 19, in order to form a top track pole, a magnetic material film 56 made of FeCo is formed is formed with a thickness of 1.0 μm, and further a magnetic material film 57 made of CoNiFe is formed with a thickness of 1.0 μm. In the present embodiment, the magnetic material film 56 is made of FeCo, but according to the invention, this film may be made of FeN or may be formed by a double-layer film FeCo/FeN. After that, by removing the photoresist film 54, portions of the alumina insulating film 52 and magnetic material films 56, 57 formed above the end portions of the innermost coil windings of the first and second thin film coil halves 46 and 53 are selectively removed to form a write gap film 58. The magnetic material film 56 is made of FeCo having a high saturation magnetic flux density of about 2.4 T, and therefore even if a track width is reduced to the order of quartermicrons, particularly 0.1–0.2 μm, a sufficiently large magnetic flux can be generated.

During the formation of the magnetic material films 56 and 57, a first jumper wiring for connecting electrically the end portion of the innermost coil winding of the first thin film coil half 46 to the end portion of the outermost coil winding of the second thin film coil half 53 and a second jumper wiring for electrically connecting the end portion of the innermost coil winding of the second thin film coil half 53 to a contact pad for connecting the thin film coil to an external circuit are made of same magnetic materials as those of the magnetic material films 56 and 57. That is to say, as shown in FIG. 17, a first jumper wiring 61 having one end contacted with the contact portion 46a of the innermost coil winding of the first thin film coil half 46 and the other end contacted with the contact portion 53c formed at the end portion of the outermost coil winding 53a of the second thin film coil half 53 and a second jumper wiring 62 one end contacted with the contact portion 53d formed at the end portion of the innermost coil winding 53b of the second thin film coil half 53 are formed. It should be noted that these jumper wirings 61 and 62 are formed on the alumina-CVD insulating film 48 via the write gap insulating film 55, but in FIG. 12, the alumina-CVD insulating film is dispensed with. The end portion of the outermost coil winding of the first thin film coil half 46 is conducted to the first contact pad by means of a third wiring 63 which is formed to extend from the coil winding. The other end of the second jumper wiring 62 is brought into contact with a fourth contact portion 64a of a fourth wiring 64 which is formed together with the first thin film coil half 46 via an opening formed in the alumina-CVD film 48, and the fourth wiring 64 extends up to the second contact pad.

As stated above, the first and second contact pads are connected to the opposite ends of the thin film coil, and the third and fourth contact pads are connected to the electrode films 36 of the GMR element. Furthermore, the first and second jumper wirings 61 and 62 are formed simultaneously with the formation of the magnetic material film constituting the top pole. In this case, since the alumina insulating film 52 is formed between the bridge portions 43a, 43b constituting the back gap and the end portions of the innermost coil windings of the first and second thin film coil halves 46 and 53, the first and second jumper wirings 61 and 62 can be effectively prevented from being brought into contact with the bridge portions 43a, 43b. In this manner, the first and second jumper wirings 61 and 62 can be protected from short-circuit.

Figure 21:
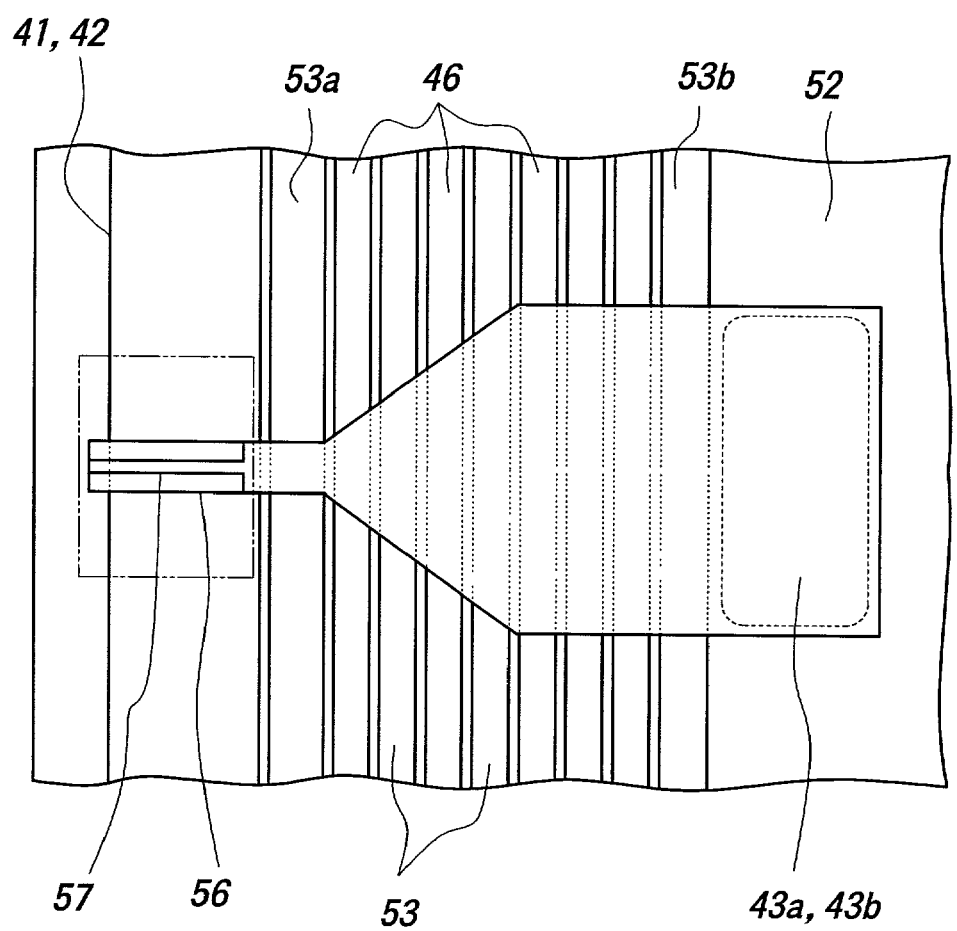
FIG. 21 is a plan view showing a top track pole and resist openings for forming the top track pole.
Figure 22B:
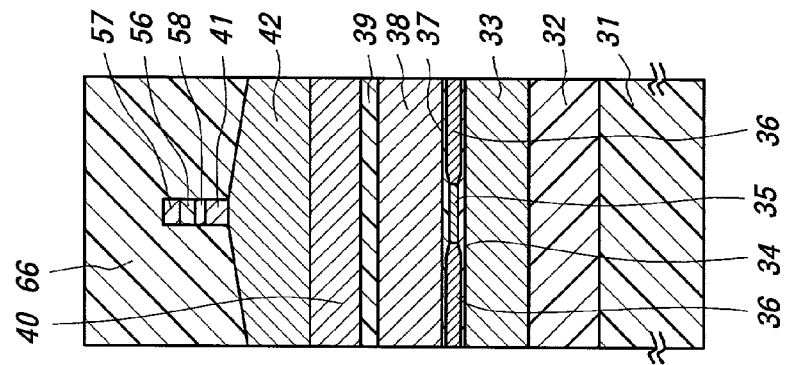
FIGS. 22A and 22B are cross sectional views representing a next manufacturing step.
Figure 22A:
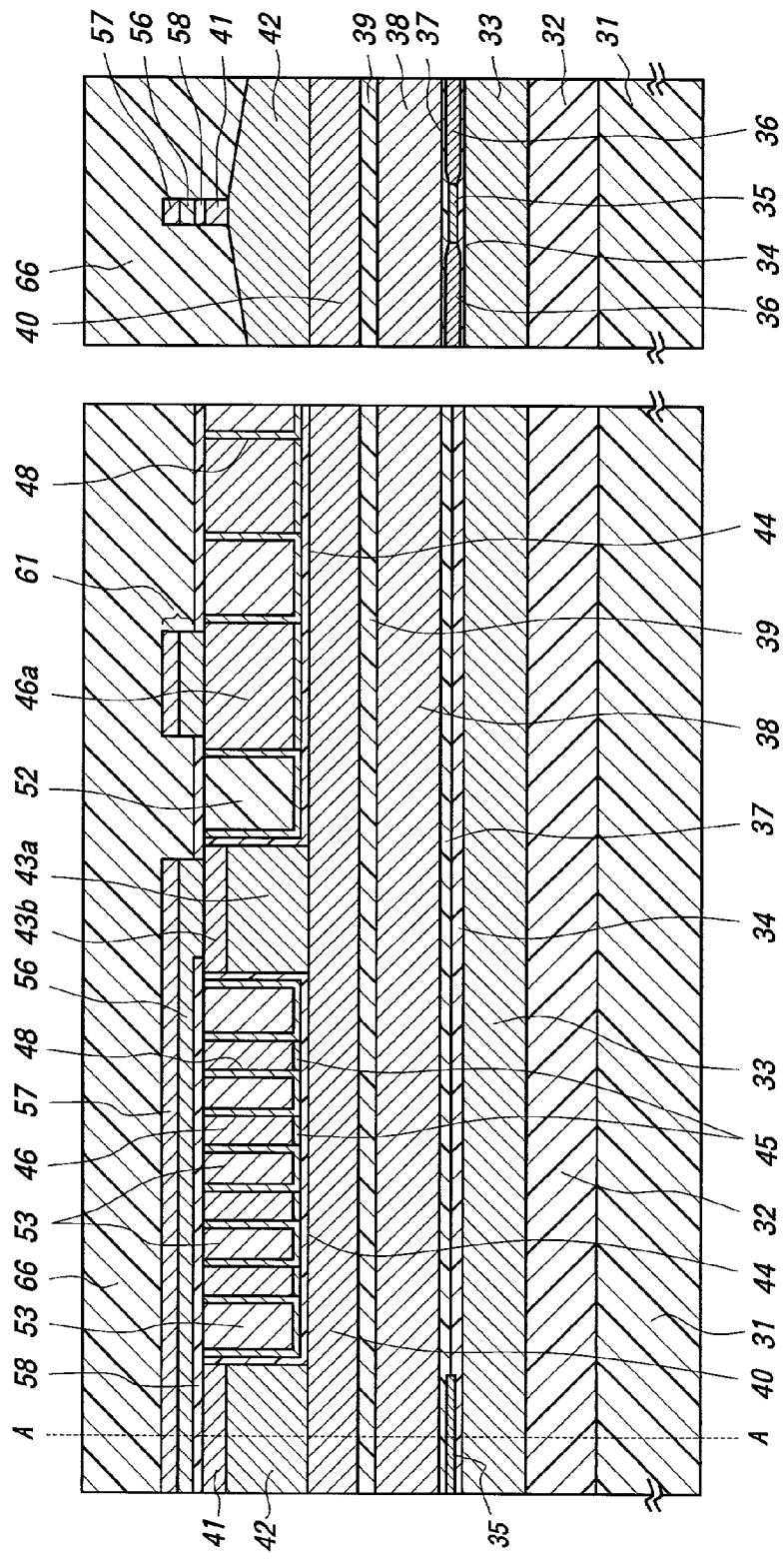

As explained above, in order to form the top track pole, the magnetic material film 57 made of CoNiFe is formed on the magnetic material film 56 with a thickness of 2–3 μm according to a given pattern. Then, the lower magnetic material film 56 is selectively removed by RIE at a temperature of 200° C. under a chlorine series gas atmosphere such as BCl$_2$ and Cl$_2$ to form the top track pole while the upper magnetic material film 57 is used as an etching mask. After that, a photoresist pattern covering the thin film coil is formed or a photoresist pattern having an opening at the writing track portion as shown in FIG. 21 is formed, and then the magnetic material film 41 is selectively removed to form the bottom track pole. Furthermore, the surface of the underlying magnetic material film 42 is selectively removed by, for instance the ion milling, over a depth equal to a part of a thickness of this film 42 to form the trim structure. Finally, as illustrated in FIG. 22, an overcoat film 66 made of alumina is formed on a whole surface.

According to the invention, it is very important to form the top track pole having a narrow width by selectively removing the magnetic material films 56, 57 by performing the RIE under a chlorine series gas such as BCl$_2$ and Cl$_2$ or a mixture gas of Cl$_2$ a boron series gas such as BCl$_2$ at a high temperature of 50–300° C., particularly 150–300° C. Then, it is possible to avoid etched debris from being attached to the pole tip portion. By carrying out the RIE under a such condition, the magnetic material having a high saturation magnetic flux density such as FeN, FeCo and CoFeNi can be etched efficiently and precisely.

In the present embodiment, the magnetic material film 56 constituting the top track pole is made of FeCo, but according to the invention, the magnetic material film 56 may be formed by a plating film of CoNiFe, NiFe (80%:20%) or NiFe (45%:55%) having a high saturation magnetic flux density. Moreover, the magnetic material film 56 may be formed by a sputtering film of FeN or FeZrN. Furthermore, the magnetic material film 56 may be formed by a multi-layer of inorganic insulating films and magnetic material films such as permalloy. In this case, a high frequency property can be further improved. In an actual process for manufacturing the thin film magnetic head, after forming a number of the above mentioned structures on the wafer, the wafer is divided in a plurality of bars in each of which a number of thin film heads are aligned. Then, a side edge of the bar is polished to obtain the air bearing surface, and the bar is divided into a particular thin film magnetic heads. In FIG. 22, a polishing surface defining the air bearing surface is denoted by a broken line A—A.

Figure 23:
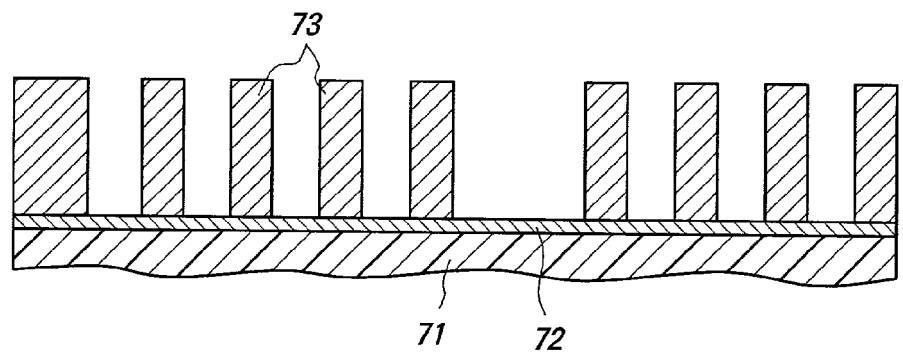
FIGS. 23–31 are cross sectional views showing successive steps of an embodiment of the method of manufacturing a conductive pattern according to the invention.
Figure 24:
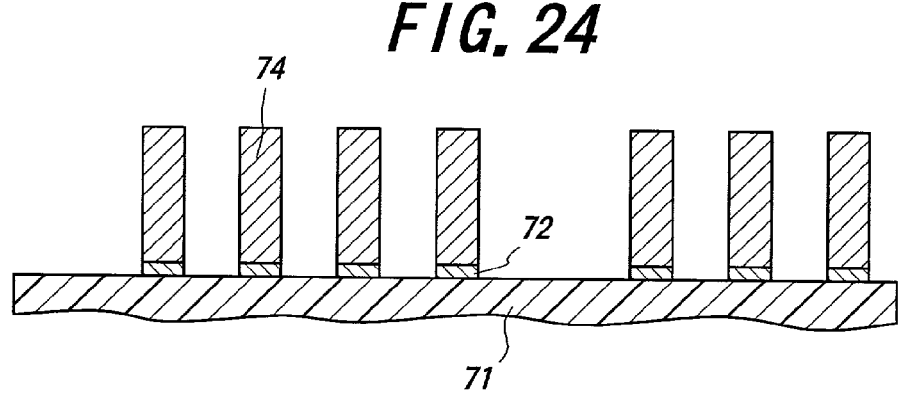

Now a first embodiment of the method of manufacturing the conductive pattern according to the invention will be explained. In the present embodiment, first and second conductive strip groups are formed on a semiconductor substrate in a self-aligned manner. As shown in FIG. 23, on a surface of a semiconductor substrate 71, a seed film 72 made of Cu is formed with a thickness of 50 nm, and a resist mask 73 is formed on the seed film in accordance with a given pattern. The resist mask 73 has an opening at a position at which the first conductive strip group is to be formed. Next, a first conductive strip half 74 is formed by an electrolytic plating process with a thickness of 0.7–1.2 μm. Then, the resist mask 73 is removed and an exposed portion of the seed film is removed to separate successive conductive strips as depicted in FIG. 24.

Figure 25:
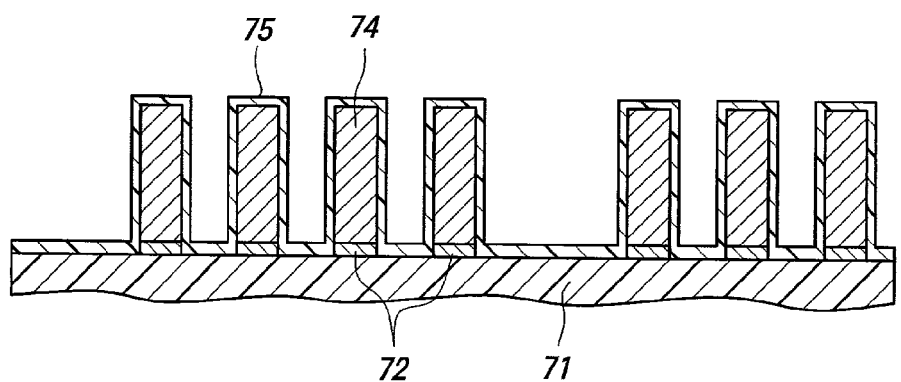

Next, as shown in FIG. 25, an alumina-CVD insulating film 75 is formed on a whole surface with a thickness of 0.1 μm. The alumina-CVD insulating film 75 is formed by an atomic layer process, in which a CVD chamber having the semiconductor substrate 71 installed therein is kept at a temperature not less than 100° C. under a reduced pressure state of 1–2 Torr, and $H_2O$, $N_2$, $N_2O$ or $H_2O_2$ and $Al(CH_3)_3$ or $AlCl_3$ are alternately projected intermittently. In this case, since a magnetic material is not used, the temperature may be increased to a melting point of copper, but due to a practical reason, it is preferable to keep the temperature to 100–700° C.

Figure 26:
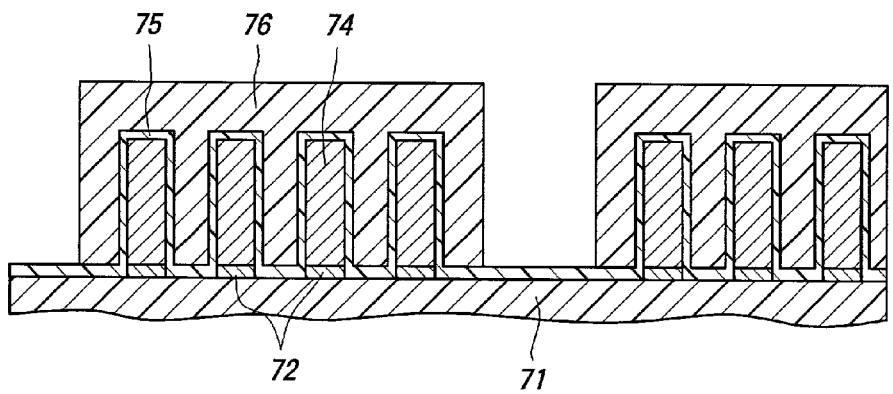
Figure 27:
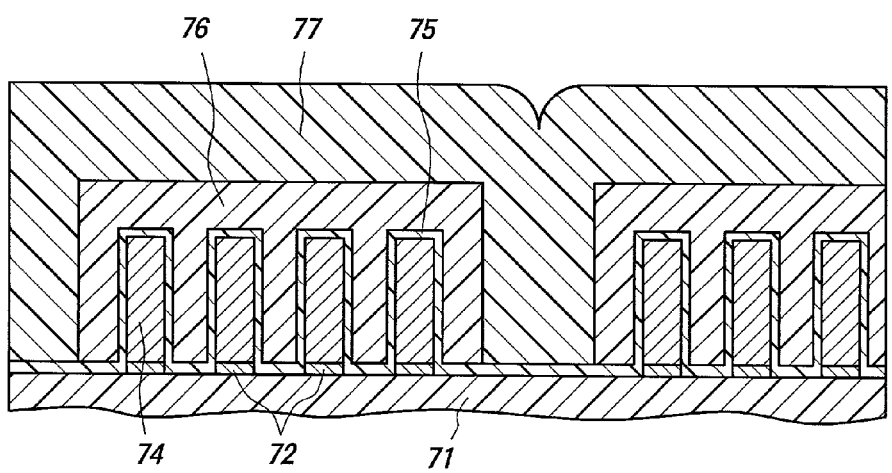
Figure 28:
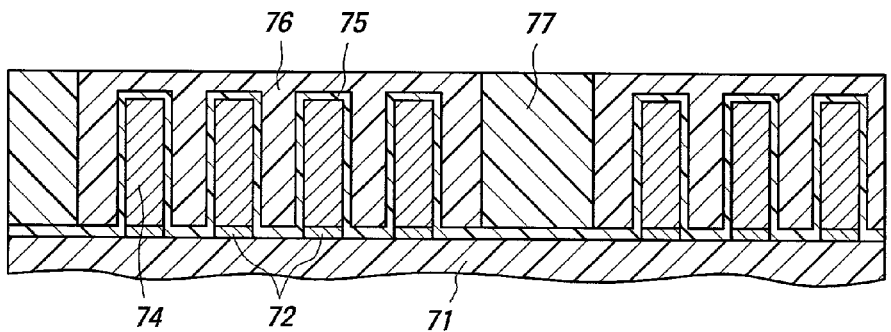
Figure 29:
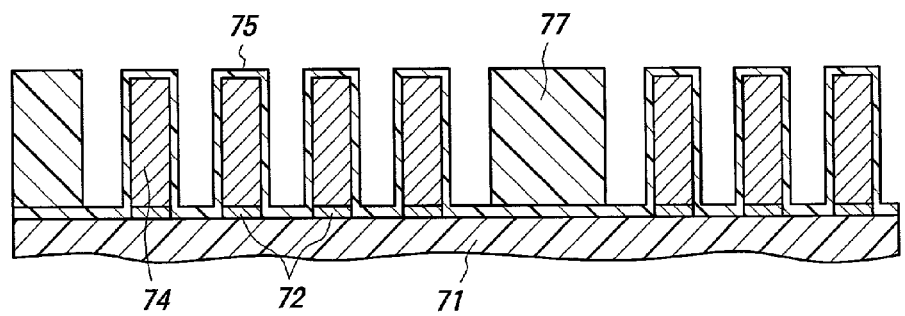

Then, as illustrated in FIG. 26, a resist mask 76 is formed on the alumina-CVD insulating film 75 such that a portion at which the conductive strip is to be formed is covered with the resist mask. Furthermore, as shown in FIG. 27, an alumina insulating film 77 is formed on a whole surface with a thickness of 0.8–1.5 $\mu$m. Then, the alumina insulating film 77 and resist mask 76 are flattened by CMP as shown in FIG. 28, and then the resist mask 76 is removed by a wet etching as depicted in FIG. 29.

Figure 30:
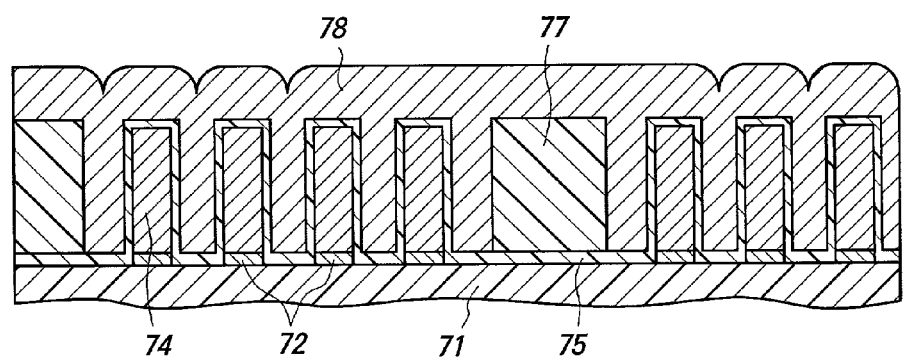
Figure 31:
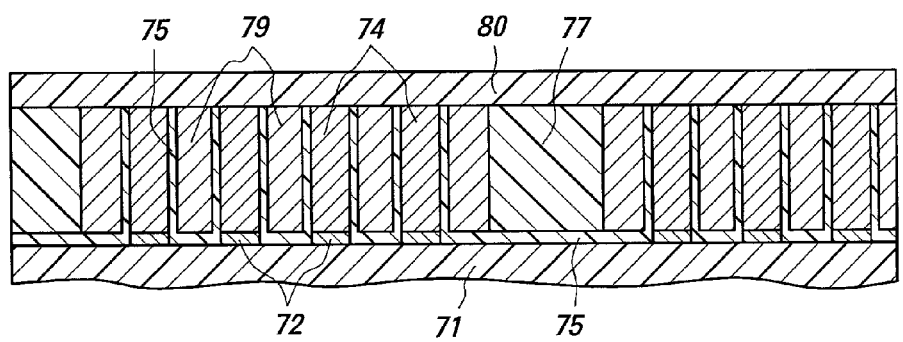

Next, as illustrated in FIG. 30, a Cu-CVD film 78 is formed on a whole surface with a thickness of 0.7–1.2 $\mu$m such that depressions formed between successive conductive strips of the first conductive strip half 74 are filled with Cu-CVD. Then, the Cu-CVD film 78 is polished by CMP such that a surface of the first conductive strip half 74 is exposed and conductive strip of a second conductive strip half 79 are formed in a self-aligned manner between successive conductive strips of the first conductive strip half 74. Finally, a silicon oxide film 80 is formed on the flat surface with a thickness of 1 $\mu$m as shown in FIG. 31.

In the present embodiment, the conductive strips of the first and second conductive strip halves 74 and 79 have a same width. When outermost conductive strips are formed by the Cu-CVD film 78, it is preferable that a width of the outermost conductive strips is slightly wider than that of the remaining conductive strips in order to compensate a possible deviation of a forming position of the resist mask 73 for forming the first conductive strip half 74.

Now a second embodiment of the method of manufacturing the conductive pattern according to the invention will be explained. In the above mentioned first embodiment, all the conductive strips have a same width, but in the present embodiment, first and second conductive strip groups having different widths are formed. However, first and second conductive strip halves of each of the first and second conductive strip groups are formed in a self-aligned manner just like as the first embodiment.

Figure 32:
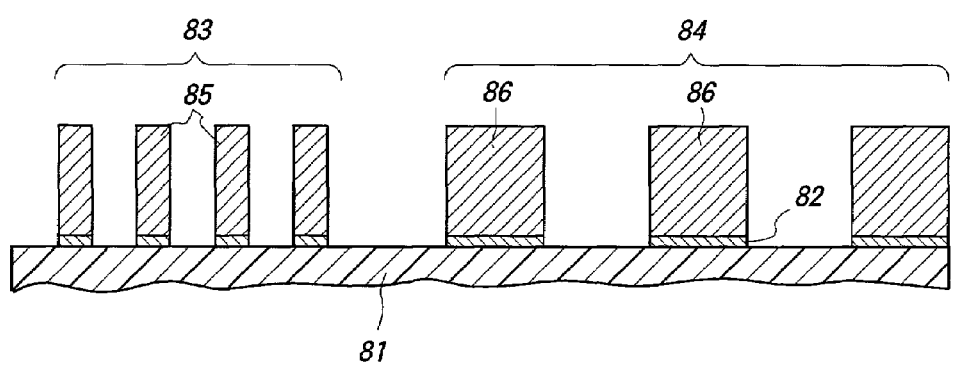
FIGS. 32–39 are cross sectional views depicting successive steps of another embodiment of the method of manufacturing a conductive pattern according to the invention.

As shown in FIG. 32, a seed film 82 made of Cu is formed on a semiconductor substrate 81 with a thickness of 50 nm, a resist mask having a given pattern is formed on the seed film, first conductive strip halves 85 and 86 of the first and second conductive strip groups 83 and 84 are formed by an electrolytic plating process with a thickness of 0.7–1.2 $\mu$m, the resist mask is removed, and an exposed portion of the seed film 82 is removed by a wet etching or a high temperature RIE at 200° C. or an ion milling.

Figure 33:
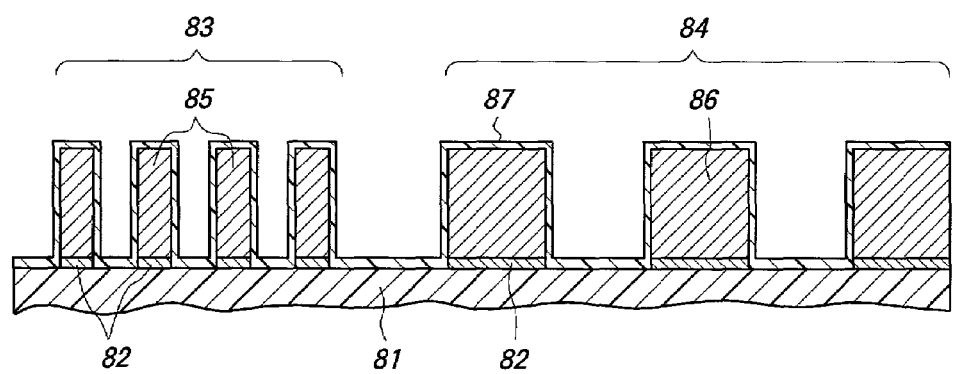

Next, as illustrated in FIG. 33, an alumina-CVD insulating film 87 is formed on a whole surface with a thickness of 0.1 $\mu$m. Like as the first embodiment, the alumina-CVD insulating film 87 is formed by an atomic layer process, in which a CVD chamber having the semiconductor substrate 81 installed therein is kept at a temperature of 100–700° C. under a reduced pressure state of 1–2 Torr, and $H_2O$, $N_2$, $N_2O$ or $H_2O_2$ and $Al(CH_3)_3$ or $AlCl_3$ are alternately projected intermittently.

Figure 34:
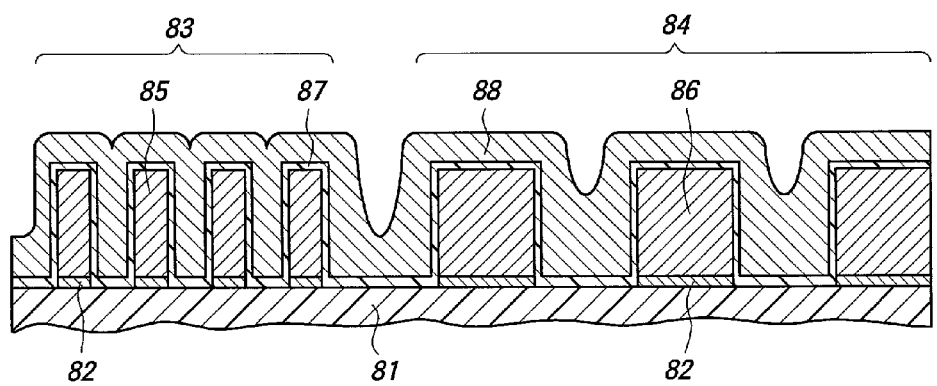

Next, as depicted in FIG. 34, a Cu-CVD film 88 is formed on a whole surface with a thickness of 0.1 $\mu$m. In this case, depressions having a narrow width formed between successive conductive strips of the first conductive strip half 85 of the first conductive strip group 83 are completely filled with the Cu-CVD, but depressions having a wider width formed between successive conductive strips of the first conductive strip half 86 of the second conductive strip group 84 are not completely filled with Cu-CVD.

Figure 35:
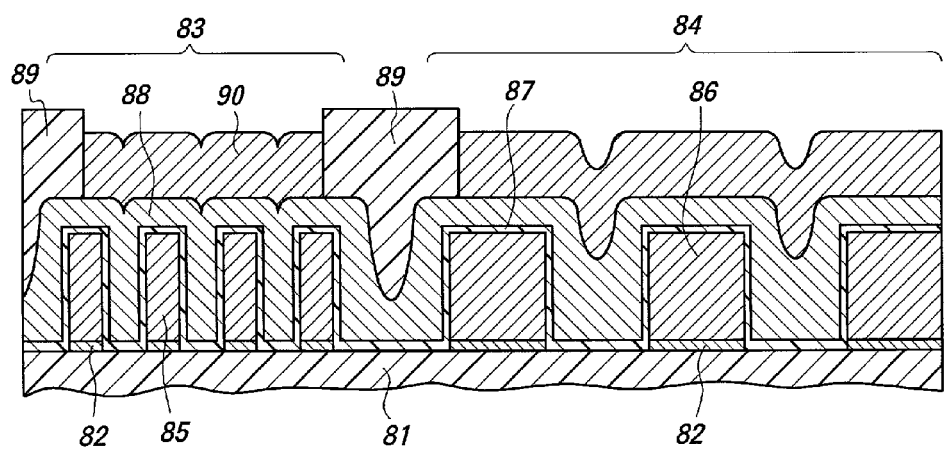

Furthermore, as shown in FIG. 35, a resist mask 89 having an opening at an area at which the conductive strips are to be formed is deposited on the Cu-CVD film 88. Then, an electrolytic plating is performed using the Cu-CVD film 88 as a seed film to form a Cu-P film 90 on the conductive strip forming area with a thickness of 1 $\mu$m. The wider depressions formed between successive conductive strips of the first conductive strip half 86 of the second conductive strip group 84 are completely filled with Cu.

Figure 36:
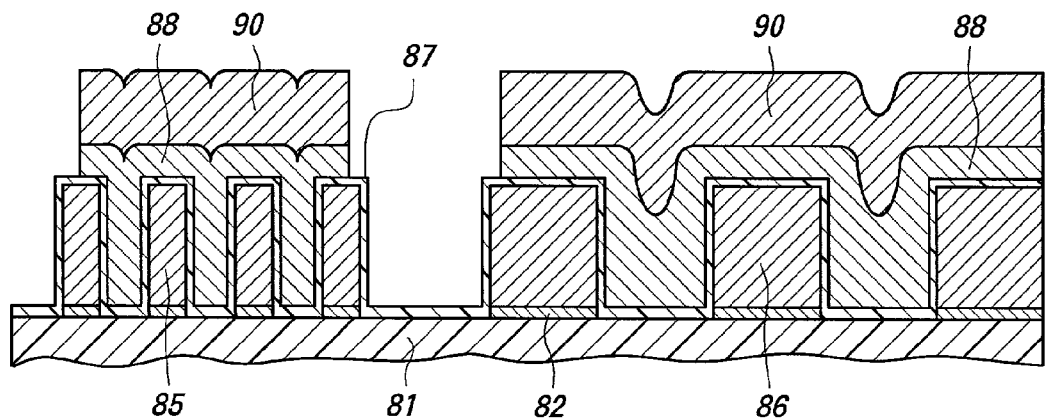
Figure 37:
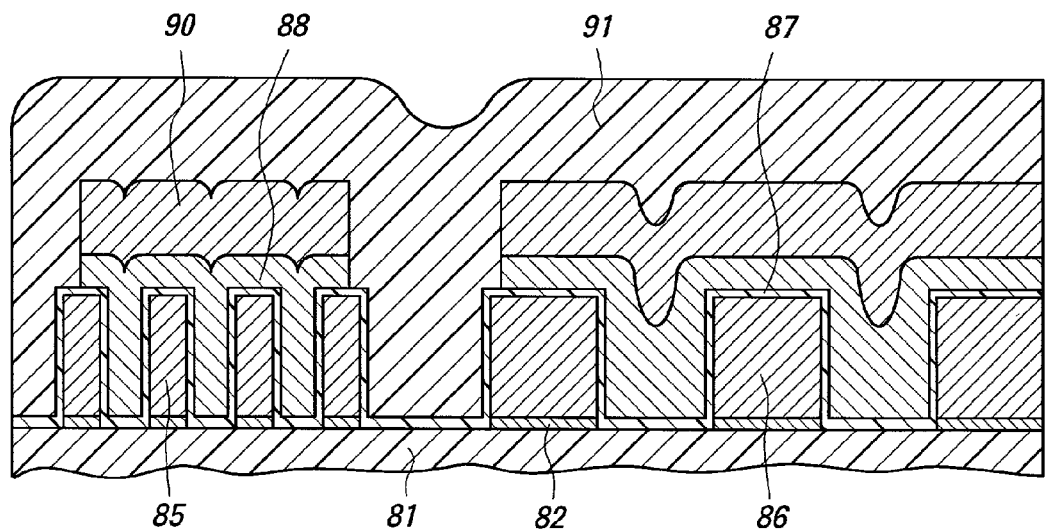
Figure 38:
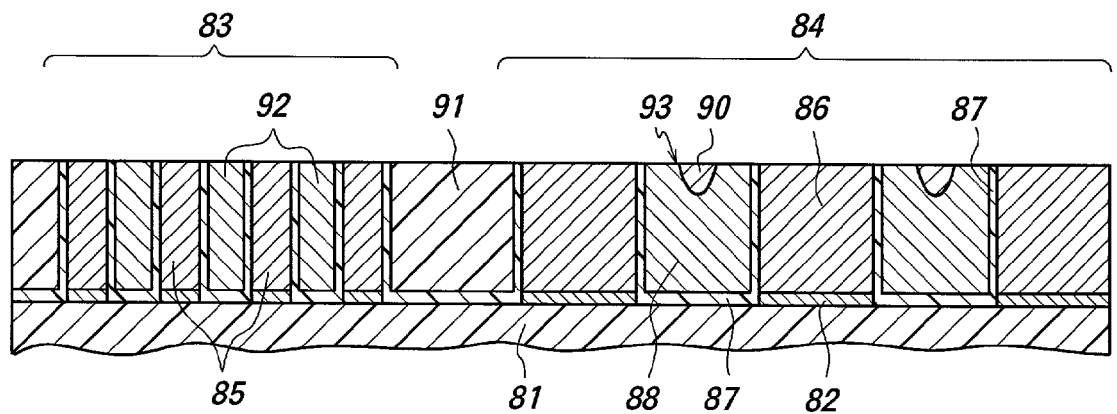

Next, after removing the resist mask 89 to expose the Cu-CVD film 88 partially, an ion milling is performed using the Cu-P film 90 as a mask to remove the exposed portion of the Cu-CVD film 88 as depicted in FIG. 36. Then, as illustrated in FIG. 37, an alumina insulating film 91 is formed on a whole surface with a thickness of 2–3 $\mu$m, and further the alumina insulating film 91, Cu-P film 90, Cu-CVD film 88 and alumina-CVD insulating film 87 are polished by CMP to obtain a flat surface as shown in FIG. 38.

Figure 39:
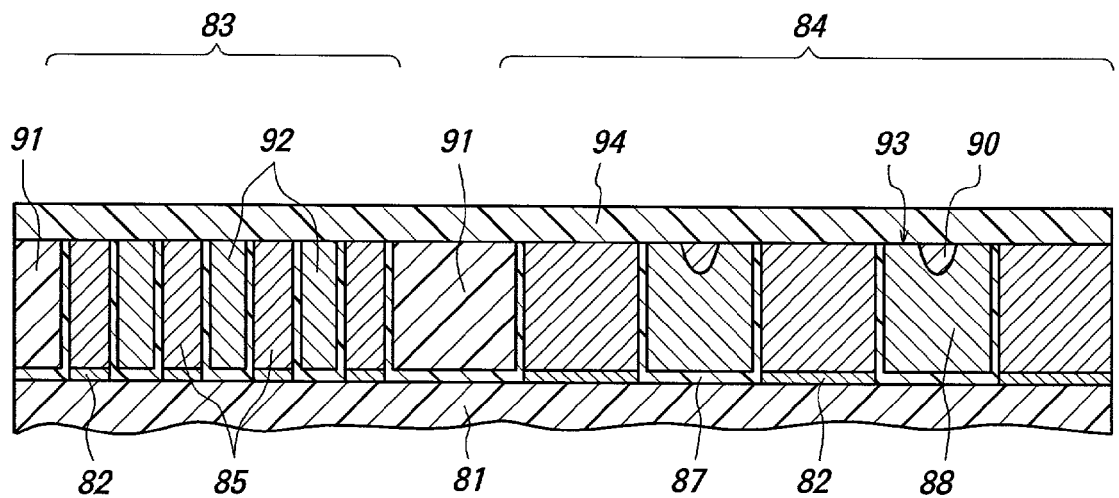

In the manner mentioned above, second conductive strip halves 92 and 93 are formed in a self-aligned manner between successive conductive strips of the first conductive strip halves 85 and 86 of the first and second conductive strip groups 83 and 84. In this case, the conductive strips of the second conductive strip half 93 of the second conductive strip group 84 are formed by the Cu-CVD film 88 and Cu-P film 90. Since adjacent conductive strips are isolated from each other by the very thin alumina-CVD insulating film 87, an area in which the conductive strip pattern is formed can be decreased to increase a degree of integration. Finally, as shown in FIG. 39, an alumina insulating film 94 is formed on the flat surface with a thickness of 11.5 $\mu$m.

As explained above, in the present embodiment, the wider conductive strips 86 and 93 are formed by a two-layer structure of the Cu-CVD film 88 and Cu-P film 90, but according to the invention all the conductive strips may be made of Cu-CVD. In general, the Cu-CVD film has a superior step-coverage, but is expensive, and the Cu-P film has a low step-coverage but is cheap. The second conductive strip halves may be formed solely by Cu-CVD or a combination of Cu-CVD and Cu-P or solely by Cu-P in accordance with total consideration of a width and a thickness of conductive strips and cost.

The present invention is not limited to the embodiments explained above, but many modifications and alternations may be conceived with the scope of the invention. For instance, in the above embodiments, unnecessary portions of u-CVD film and Cu-P film are removed by CMP, but they may be removed by a dry etching or ion beam milling. Alternatively, these films may be first etched roughly by CMP and then may be precisely etched by a dry etching such as an ion beam milling and sputter etching.

In the thin film magnetic head and the method of manufacturing the same according to the invention, the thin film coil can be formed very precisely in a self-aligned manner, and therefore a distance between successive coil windings of the thin film coil halves can be shortened extremely. This results in that a magnetic path length can be shortened and the properties of the thin film magnetic head such as magnetic flux rising property, NLTS property and overwrite property can be improved. That is to say, the very thin insulating film having a thickness of 0.03–0.25 $\mu$m and provided between successive coil windings of the thin film coil halves is made of an inorganic insulating material such as alumina, silicon oxide and silicon nitride which can be miniaturized very finely, and thus a distance between successive coil windings can be shortened to 0.03–0.25 µm. In this manner, it is possible to generate a sufficiently large magnetic flux by a single layer thin film coil, and an apex angle can be reduced and a width of track can be decreased. Moreover, since a distance between successive coil windings of the first thin film coil half can be large, an etching process for removing the seed film can be performed well and debris of etched material could hardly adhered to coil windings.

The top and bottom track poles are formed by etching the flat magnetic material films, and therefore these track poles can be formed into a given pattern accurately. Furthermore, these track poles are formed in a self-aligned manner, and thus the track poles having a very narrow width such as 0.1–0.3 µm can be formed precisely and stably. These track poles are made of magnetic materials having a high saturation magnetic flux density such as FeN and FeCo, and a magnetic flux generated by the thin film coil is not saturated and passes effectively through the track poles having a miniaturized structure. Therefore, a loss of a magnetic flux can be avoided and a large magnetic flux required by a record medium having a high surface recording density can be generated effectively. In this manner, the performance of the thin film magnetic head can be improved.

When the plating film of CoNiFe is used as an etching mask in RIE for removing the upper magnetic material film of the top track pole, an etching rate of the plating film of CoNiFe is smaller than that of the magnetic film of FeN or FeCo by two to three times. Therefore, the plating film of CoNiFe is suitable for RIE and the track pole having a desired thickness can be formed accurately. Furthermore, the plating film of CoNiFe has a higher hardness than FeN or FeCo, and thus if the track pole is formed solely by the plating film of CoNiFe, a thickness has to be increased and an undesired peeling-off might occur due to an internal stress. However, according to the invention, since the top track pole has the two-layer structure, the plating film of CoNiFe can be made thin although the plating film of CoNiFe is used as the top track pole, and the problem of peeling-off can be avoided.

If the track pole having a narrow width of 0.1–0.2 µm is formed solely by the plating film of CoNiFe, there are many problems in a mass production due to a difficulty in a composition control of three components. However, when the track pole is formed to have the two-layer structure in the embodiments according to the invention, even if a thickness or a composition of the upper magnetic material film formed by the plating film of CoNiFe fluctuate slightly, the underlying magnetic material film can be etched accurately. In this manner, according to the present invention, it is possible to provide the thin film magnetic head comprising the track chip portion having a very narrow width of 0.1–0.3 µm, while the thin film magnetic head has superior properties and undesired leakage and saturation of a magnetic flux can be suppressed.

In the combination type thin film magnetic head according to the invention, since the top track pole is made of the magnetic materials having a high saturation magnetic flux density, a height (thickness) of the track pole can be reduced. Therefore, a thickness of the frame pattern of photoresist defining a shape of the magnetic material films can be also reduced, and thus a focus of photolithography can be sharp and a resist having a higher sensitivity can be used. In this manner, a photolithography having a higher resolution can be performed and the miniaturized top track pole can be formed accurately.

In the embodiment in which the jumper wirings for connecting electrically the first and second thin film coil halves are made of a same magnetic material as that of the top pole simultaneously with the top pole, a wiring manufacturing process can be simple and a throughput can be improved.

In the conductive pattern and the method of manufacturing the same according to the invention, since very narrow conductive strips can be arranged with interposing therebetween an extremely thin insulating film, a conductive strip forming area can be reduced and a degree of integration can be improved. When the second conductive strip half is formed by the two-layer structure of Cu-CVD film and Cu-P film, it is possible to manufacture a conductive pattern in which conductive strips having a narrow width and conductive strips having a wider width are mixed.

What is claimed is:

1. A conductive pattern comprising:
   a substrate having an electrically insulating surface;
   a plurality of first conductive strip halves of a first conductive strip group, said first conductive strip halves having a second width and being arranged on the surface of the substrate such that the first conductive strip halves are separated from each other to form depressions having a first width;
   a plurality of first conductive strip halves of a second conductive strip group, said first conductive strip halves having a fourth width larger than the second width and being arranged on the surface of the substrate such that the first conductive strip halves are separated from each other to form depressions having a third width larger than the first width;
   a first insulating film formed on the surface of the substrate and surfaces of the depressions formed between successive first conductive strip halves of the first and second conductive strip groups;
   a second insulating film formed on a portion of the surface of the substrate at which said first conductive strip halves of the first and second conductive strip groups are not formed;
   a plurality of second conductive strip halves of the first conductive strip group formed on the first insulating layer such that said depressions formed between successive first conductive strip halves of the first conductive strip group are filled with the second conductive strip halves of the second conductive strip group;
   a plurality of second conductive strip halves of the second conductive strip group formed on the first insulating film such that said depressions formed between successive first conductive strip halves of the second conductive strip group are filled with the second conductive strip halves of the second conductive strip group, each of said second conductive strip halves of the second conductive strip group having a two-layer structure having a first conductive CVD film and a second conductive electrolytic plating film; and
   a third insulating film formed on a coplanar flat surface of the first and second conductive strip halves of the first conductive strip group, the first and second conductive strip halves of the second conductive strip group and the second insulting film.

2. The conductive pattern according to claim 1, wherein each of said first conductive strip halves of the first and second conductive strip groups includes a conductive electrolytic plating film.

3. The conductive pattern according to claim 2, wherein the conductive electrolytic plating strip of each of said first conductive strip halves of the first and second conductive strip groups includes a conductive Cu-plating film, each of said second conductive strip halves of the first conductive strip group includes a Cu-CVD film, each of said first conductive CVD-films of the second conductive strip halves of the second conductive strip group includes a Cu-CVD film and each of said second conductive electrolytic plating films of the second conductive strip halves of the second conductive strip group includes a Cu-plating film.

4. The conductive pattern according to claim 1, wherein said first insulating film interposed between said first and second conductive strip halves of the first and second conductive strip groups includes an alumina-CVD film.

5. A conductive pattern comprising:
a substrate having an electrically insulating surface;
a plurality of first conductive strips arranged on the surface of the substrate such that the first conductive strips are separated from each other to form depressions, each of said first conductive strips including an electrolytic plating strip;
a first insulating film formed on the surface of the substrate and surfaces of the depressions;
a second insulating film formed on a portion of the surface of the substrate at which said first conductive strips are not formed;
a plurality of second conductive strips formed on the first insulating film such that said depressions formed between successive first conductive strip halves are filled with the second conductive strips, each of said second conductive strips include a conductive CVD-strip; and
a third insulating film formed on a coplanar flat surface of the first and second conductive strips and second insulating film.

6. The conductive pattern according to claim 5, wherein each of said first conductive strips includes a conductive electrolytic plating film.

7. The conductive pattern according to claim 6, wherein each of said first conductive strips includes a Cu-plating film and each of said second conductive strips includes a Cu-CVD film.

8. The conductive pattern according to claim 5, wherein said first insulating film interposed between said first and second conductive strips includes an alumina-CVD film.

9. A method of manufacturing the conductive pattern as claimed in claim 1, comprising:
forming, on an electrically insulating surface of a substrate, the plurality of first conductive strip halves of a first conductive strip group having a second width and being arranged such that said first conductive strip halves of the first conductive strip group are separated from each other to form depressions having a first width, and the plurality of first conductive strip halves of a second conductive strip group having a fourth width larger than the second width and being arranged such that the first conductive strip halves of the second conductive strip group are separated from each other to form depressions having a third width larger than the first width;

forming a first insulating film on the surface of the substrate and surfaces of the first conductive strip halves of the first and second conductive strip groups;
forming a covering film selectively on a region in which said first and second conductive strip groups are formed;
forming a second insulating film on a region in which the first and second conductive strip groups are not formed;
forming, after removing said covering film, a first conductive film by CVD on said first insulating film such that the depressions formed between said first conductive strip halves of the first conductive strip group are completely filled with the first conductive film and the depressions formed between said first conductive strip halves of the second conductive strip group are partially filled with the first conductive film;
forming a second conductive film by electrolytic plating on the first conductive film such that the depressions formed between successive first conductive strip halves of the second conductive strip group are completely filled;
polishing said first and second conductive films, a portion of said first insulating film covering the surfaces of the first conductive strip halves of the first and second conductive strip groups and said second insulating film such that surfaces of the first conductive strip halves of the first and second conductive strip groups are exposed to form the plurality of second conductive strip halves of the second conductive strip group arranged in said depressions formed between successive first conductive strip halves of the first conductive strip group and made by said first conductive film and to form the plurality of second conductive strip halves of the second conductive strip group arranged in said depressions formed between successive first conductive strip halves of the second conductive strip group and having a two-layer structure composed of the first conductive film formed by CVD and the second conductive film formed by electrolytic plating; and
forming a third insulating film on a coplanar flat surface of the first and second conductive strip halves of the first and second conductive strip groups and the second insulating film.

10. The method according to claim 9, wherein said first insulating film interposed between successive conductive strips of the first and second conductive strip halves of the first and second conductive strip groups is formed by alumina-CVD.

11. The method according to claim 10, wherein said first insulating film is formed by an atomic layer process, in which $Al(CH_3)_3$ or $AlCl_3$ and $H_2O$, $N_2$, $N_2O$ or $H_2O_2$ are alternately projected intermittently at a temperature of 100–700° C. under a reduced pressure state of 1–2 Torr.

12. A method of manufacturing the conductive pattern as claimed in claim 5, comprising:
forming the plurality of first conductive strip halves having a given width on an electrically insulating surface of a substrate such that the first conductive strip halves are separated from each other to form depressions having a given width;
forming the first insulating film on the surface of the substrate and surfaces of the depressions formed between successive first conductive strip halves;

forming a resist selectively on areas at which said first conductive strip halves are formed;

forming the second insulating film on a portion of the surface of the substrate which are not covered with the resist;

forming, after removing said resist, a conductive film such that the depressions formed between successive first conductive strip halves are filled with the conductive film;

polishing the conductive film, the first and second insulating films formed on the first conductive strip halves such that the first conductive strip halves are exposed to form the plurality of second conductive strip halves embedded in said depressions formed between successive first conductive strip halves; and forming a third insulating film on a coplanar flat surface of the first and second conductive strip halves and the second insulating film, said coplanar surface being formed by said polishing.

13. The method according to claim 12, wherein said first insulating film interposed between successive first and second conductive strip halves is formed by alumina-CVD.

14. The method according to claim 13, wherein said first insulating film is formed by an atomic layer process, in which $Al(CH_3)_3$ or $AlCl_3$ and $H_2O$, $N_2$, $N_2O$ or $H_2O_2$ are alternately projected intermittently at a temperature of 100–700° C. under a reduced pressure state of 1–2 Torr.

* * * * *